US007555225B2

(12) United States Patent  
Mahgerefteh et al.

(10) Patent No.: US 7,555,225 B2
(45) Date of Patent: *Jun. 30, 2009

(54) OPTICAL SYSTEM COMPRISING AN FM SOURCE AND A SPECTRAL RESHAPING ELEMENT

(75) Inventors: Daniel Mahgerefteh, Los Angeles, CA (US); Yasuhiro Matsui, Lawrence, MA (US); Xueyan Zheng, Culver City, CA (US); Bart Johnson, North Andover, MA (US); Duncan Walker, Walton-on-Thames (GB); Parviz Tayebati, Weston, MA (US)

(73) Assignee: Finisar Corporation, Sunnyvale, CA (US)

( * ) Notice: Subject to any disclaimer, the term of this patent is extended or adjusted under 35 U.S.C. 154(b) by 496 days.

This patent is subject to a terminal disclaimer.

(21) Appl. No.: 11/068,032

(22) Filed: Feb. 28, 2005

(65) Prior Publication Data

US 2006/0029358 A1 Feb. 9, 2006

Related U.S. Application Data

(63) Continuation-in-part of application No. 10/680,607, filed on Oct. 6, 2003, now Pat. No. 7,054,538, and a continuation-in-part of application No. 10/308,522, filed on Dec. 3, 2002, and a continuation-in-part of application No. 10/289,944, filed on Nov. 6, 2002, now Pat. No. 6,963,685.

(60) Provisional application No. 60/548,230, filed on Feb. 27, 2004, provisional application No. 60/554,243, filed on Mar. 18, 2004, provisional application No. 60/566,060, filed on Apr. 28, 2004, provisional application No. 60/567,737, filed on May 3, 2004, provisional application No. 60/569,769, filed on May 10, 2004, provisional application No. 60/569,768, filed on May 10, 2004, provisional application No. 60/621,755, filed on Oct. 25, 2004, provisional application No. 60/629,741, filed on Nov. 19, 2004.

(51) Int. Cl.
*H04B 10/04* (2006.01)
(52) U.S. Cl. .................. 398/185; 398/199; 398/201
(58) Field of Classification Search ............. 398/185, 398/199, 201
See application file for complete search history.

(56) References Cited

U.S. PATENT DOCUMENTS 4,561,119 A 12/1985 Epworth (Continued)

FOREIGN PATENT DOCUMENTS

GB 2107147 A 4/1983

OTHER PUBLICATIONS

YU et al. Optimization of the Frequency Response of a Semiconductor Optical Amplifier Wavelength Converter Using a Fiber Bragg Grating, Journal of Lightwave Technology, Feb. 1999, 308-315, vol. 17, No. 2.

(Continued)

*Primary Examiner*—Leslie Pascal
(74) *Attorney, Agent, or Firm*—Workman Nydegger

(57) ABSTRACT

An optical communication system which has an optical signal source adapted to receive a base binary signal and produce a first signal, said first signal being frequency modulated; and an optical spectrum reshaper adapted to reshape the first signal into a second signal, said second signal being amplitude modulated and frequency modulated in which the frequency characteristics of said first signal, and the optical characteristics of said optical spectrum reshaper, being such that the frequency characteristics of said second signal are configured so as to increase the tolerance of the second signal to dispersion in a transmission fiber.

37 Claims, 22 Drawing Sheets

Optical FM/AM source and bandwidth limiting OSR or filter.

U.S. PATENT DOCUMENTS

| | | | |
|---|---|---|---|
| 4,805,235 | A | 2/1989 | Henmi |
| 5,371,625 | A | 12/1994 | Wedding et al. |
| 5,416,629 | A | 5/1995 | Huber |
| 5,550,667 | A | 8/1996 | Kimmel |
| 5,920,416 | A | 7/1999 | Beylat et al. |
| 5,974,209 | A | 10/1999 | Cho et al. |
| 6,081,361 | A | 6/2000 | Adams |
| 6,104,851 | A | 8/2000 | Mahgerefteh |
| 6,115,403 | A | 9/2000 | Brenner et al. |
| 6,298,186 | B1 | 10/2001 | He |
| 6,331,991 | B1 * | 12/2001 | Mahgerefteh ............... 372/33 |
| 6,473,214 | B1 * | 10/2002 | Roberts et al. .............. 398/183 |
| 6,563,623 | B1 | 5/2003 | Penninckx et al. |
| 6,618,513 | B2 | 9/2003 | Evankow, Jr. |
| 6,963,685 | B2 * | 11/2005 | Mahgerefteh et al. ......... 385/37 |
| 7,013,090 | B2 | 3/2006 | Adachi |
| 2004/0008933 | A1 | 1/2004 | Mahgerefteh et al. |
| 2004/0096221 | A1 | 5/2004 | Mahgerefteh et al. |
| 2004/0218890 | A1 | 11/2004 | Mahgerefteh et al. |

OTHER PUBLICATIONS

U.S. Appl. No. 11/084,630, filed Mar. 18, 2005, Mahgerefteh et al.

Lee, Chang-Hee et al., Transmission of Directly Modulated 2.5-Gb/s Signals Over 250-km of Nondispersion-Shifted Fiber by Using a Spectral Filtering Method, IEEE Photonics Technology Letters, Dec. 1996, 1725-1727, vol. 8, No. 12.

Corvini, P.J. et al., Computer Simulation of High-Bit-Rate Optical Fiber Transmission Using Single-Frequency Lasers, Journal of Lightwave Technology, Nov. 1987, 1591-1595, vol. LT-5, No. 11.

Wedding, B., et al., 10-Gb/s Optical Transmission up to 253 km Via Standard Single-Mode Fiber Using the Method of Dispersion-Supported Transmission, Journal of Lightwave Technology, Oct. 1994, 1720, vol. 12, No. 10.

Kurtzke C. et al., Impact of Residual Amplitude modulation on the Performance of Dispersion-Supported and Dispersion-Mediated Nonlinearity-Enhanced Transmission, Electronics Letters, Jun. 9, 1994, 988, vol. 30, No. 12.

Rasmussen, C.J. et al., Optimum Amplitude and Frequency-Modulation in an Optical Communication System Based on Dispersion Supported Transmission, Electronics Letters, Apr. 27, 1995, 746, vol. 31, No. 9.

Wedding, B., Analysis of Fibre Transfer Function and Determination of Receiver Frequency Response for Dispersion Supported Transmission, Electronics Letters, Jan. 6, 1994, 58, vol. 30, No. 1.

* cited by examiner

An optical digital signal with concomitant amplitude modulation and frequency modulation (flat-topped chirp).

Instantaneous frequency and phase of a 101 bit sequence for flat-topped chirp values of 5 GHz and 10 GHz for a 10 Gb/s digital signal A 101 bit sequence with and without flat-topped chirp before and after propagation.

Gaussian pulse with adiabatic chirp profile before an OSR and resulting pulse shape and flat-topped chirp after an OSR.

Instantaneous frequency profile of the pulse and definitions

Receiver sensitivity after 200 km as a function of the rise time and fall times of the instantaneous frequency profile Instantaneous frequency profile and intensity profile after an OSR with two different slopes.

Optical spectrum of an adiabatically chirped signal, the spectrum of the OSR, and the resulting reshaped spectrum.

Receiver sensitivity after 200 km of 17 ps/nm/km fiber for various values of adiabatic chirp, and spectral shift of signal relative to the OSR, which in this example is a 3 cavity etalon filter.

An example of a non-Gaussian OSR and spectral position of signal relative to the OSR spectrum.

Definition of Slope of slope on an OSR

Bessel filters used as OSR provide the desired slope of slope.

Optical and electrical eye diagrams before and after transmission through 200 km (3400 ps/nm) of fiber.

Eye diagrams for back-back and after 200 km of fiber for a chirp managed laser (CML™) transmitter with transient chirp at the output of the laser Measured slope and Slope of slope for a 2 cavity etalon.

Transmission and slope of an edge filter used as an OSR

Example of an OSR with its dispersion profile.

Sensitivity versus fiber length of dispersion 17 ps/nm/km with and without dispersion of the OSR taken into account.

FM optical source with a DFB FM modulator and separate amplitude modulator.

FM optical source with a modulated DFB and integrated Electro-absorption modulator.

Temporal profiles of the AM and FM signals.

Optical FM/AM source and bandwidth limiting OSR or filter.

OPTICAL SYSTEM COMPRISING AN FM SOURCE AND A SPECTRAL RESHAPING ELEMENT

REFERENCE TO PENDING PRIOR PATENT APPLICATIONS

This patent application:

(i) is a continuation-in-part of prior U.S. patent application Ser. No. 10/289,944, filed Nov. 6, 2002 now U. S. Pat. No. 6,963,685 by Daniel Mahgerefteh et al. for POWER SOURCE FOR A DISPERSION COMPENSATION FIBER OPTIC SYSTEM;

(ii) is a continuation-in-part of pending prior U.S. patent application Ser. No. 10/308,522, filed Dec. 3, 2002 by Daniel Mahgerefteh et al. for HIGH-SPEED TRANSMISSION SYSTEM COMPRISING A COUPLED MULTI-CAVITY OPTICAL DISCRIMINATOR;

(iii) is a continuation-in-part of prior U.S. patent application Ser. No. 10/680,607, filed Oct. 6, 2003 now by U.S. Pat. No. 7,054,538 by Daniel Mahgerefteh et al. for FLAT DISPERSION FREQUENCY DISCRIMINATOR (FDFD);

(iv) claims benefit of prior U.S. Provisional Patent Application Ser. No. 60/548,230, filed Feb. 27, 2004 by Yasuhiro Matsui et al. for OPTICAL SYSTEM COMPRISING AN FM SOURCE AND A SPECTRAL RESHAPING ELEMENT;

(v) claims benefit of prior U.S. Provisional Patent Application Ser. No. 60/554,243, filed Mar. 18, 2004 by Daniel Mahgerefteh et al. for FLAT CHIRP INDUCED BY FILTER EDGE;

(vi) claims benefit of prior U.S. Provisional Patent Application Ser. No. 60/566,060, filed Apr. 28, 2004 by Daniel Mahgerefteh et al. for A METHOD OF TRANSMISSION USING PARTIAL FM AND AM MODULATION;

(vii) claims benefit of prior U.S. Provisional Patent Application Ser. No. 60/567,737, filed May 3, 2004 by Daniel Mahgerefteh et al. for ADIABATIC FREQUENCY MODULATION (AFM);

(viii) claims benefit of prior U.S. Provisional Patent Application Ser. No. 60/569,769, filed May 10, 2004 by Daniel Mahgerefteh et al. for FLAT CHIRP INDUCED BY AN OPTICAL FILTER EDGE;

(ix) claims benefit of prior U.S. Provisional Patent Application Ser. No. 60/569,768, filed May 10, 2004 by Daniel Mahgerefteh et al. for METHOD OF TRANSMISSION USING PARTIAL FM AND AM MODULATION;

(x) claims benefit of prior U.S. Provisional Patent Application Ser. No. 60/621,755, filed Oct. 25, 2004 by Kevin McCallion et al. for SPECTRAL RESPONSE MODIFICATION VIA SPATIAL FILTERING WITH OPTICAL FIBER; and (xi) claims benefit of prior U.S. Provisional Patent Application Ser. No. 60/629,741, filed Nov. 19, 2004 by Yasuhiro Matsui et al. for OPTICAL SYSTEM COMPRISING AN FM SOURCE AND A SPECTRAL RESHAPING ELEMENT.

The eleven above-identified patent applications are hereby incorporated herein by reference.

FIELD OF THE INVENTION

This invention relates to signal transmissions in general, and more particularly to the transmission of optical signals and electrical signals.

BACKGROUND OF THE INVENTION

The quality and performance of a digital fiber optic transmitter is determined by the distance over which the transmitted digital signal can propagate without severe distortions. The bit error rate (BER) of the signal is measured at a receiver after propagation through dispersive fiber and the optical power required to obtain a certain BER, typically $10^{-12}$, called the sensitivity, is determined. The difference in sensitivity at the output of the transmitter with the sensitivity after propagation is called dispersion penalty. This is typically characterized the distance over which a dispersion penalty reaches a level of ~1 dB. A standard 10 Gb/s optical digital transmitter, such as an externally modulated source can transmit up to a distance of ~50 km in standard single mode fiber at 1550 nm before the dispersion penalty reaches the level of ~1 dB, called the dispersion limit. The dispersion limit is determined by the fundamental assumption that the digital signal is transform limited, i.e. the signal has no time varying phase across its bits and has a bit period of 100 ps, or 1/(bit rate). Another measure of the quality of a transmitter is the absolute sensitivity after fiber propagation.

Three types of optical transmitters are presently in use in prior art fiber optic systems: (i) directly modulated laser (DML), (ii) Electroabsorption Modulated Laser (EML), and (iii) Externally Modulated Mach Zhender (MZ). For transmission in standard single mode fiber at 10 Gb/s, and 1550 nm, it has generally been assumed that MZ modulators and EMLs can have the longest reach, typically reaching 80 km. Using a special coding scheme, referred to as phase shaped duobinary, MZ transmitters can reach 200 km. On the other hand, directly modulated lasers (DML) reach <5 km because their inherent time dependent chirp causes severe distortion of the signal after this distance.

By way of example, various systems for long-reach lightwave data transmission (>80 km at 10 Gb/s) through optical fibers which increase the reach of DMLs to >80 km at 10 Gb/s in single mode fiber are disclosed in (i) U.S. patent application Ser. No. 10/289,944, filed Nov. 6, 2002 by Daniel Mahgerefteh et al. for POWER SOURCE FOR A DISPERSION COMPENSATION FIBER OPTIC SYSTEM; (ii) U.S. patent application Ser. No. 10/680,607, filed Oct. 6, 2003 by Daniel Mahgerefteh et al. for FLAT DISPERSION FREQUENCY DISCRIMINATOR (FDFD); and (iii) U.S. patent application Ser. No. 10/308,522, filed Dec. 3, 2002 by Daniel Mahgerefteh et al. for HIGH-SPEED TRANSMISSION SYSTEM COMPRISING A COUPLED MULTI-CAVITY OPTICAL DISCRIMINATOR; which patent applications are hereby incorporated herein by reference. The transmitter associated with these novel systems is sometimes referred to as a Chirp Managed Laser (CML)™ by Azna LLC of Wilmington, Mass. In these new systems, a Frequency Modulated (AFM) source is followed by an Optical Spectrum Reshaper (OSR) which uses the frequency modulation to increase the amplitude modulated signal and partially compensate for dispersion in the transmission fiber. In one embodiment, the frequency modulated source may comprise a Directly Modulated Laser (DML). The Optical Spectrum Reshaper (OSR), sometimes referred to as a frequency discriminator, can be formed by an appropriate optical element that has a wavelength-dependent transmission function. The OSR can be adapted to convert frequency modulation to amplitude modulation.

In the novel system of the present invention, the chirp properties of the frequency modulated source are separately adapted and then further reshaped by configuring the OSR to further extend the reach of a CML™ transmitter to over 250 km on standard single mode fiber at 10 Gb/s and 1550 nm. The novel system of the present invention combines, among other things, selected features of systems described in (i) U.S. Provisional Patent Application Serial No. 60/548,230, filed Feb. 27, 2004 by Yasuhiro Matsui et al. for entitled OPTICAL SYSTEM COMPRISING AN FM SOURCE AND A SPECTRAL RESHAPING ELEMENT; (ii) U.S. Provisional Patent Application Ser. No. 60/554,243, filed Mar. 18, 2004 by Daniel Mahgerefteh et al. for FLAT CHIRP INDUCED BY FILTER EDGE; (iv) U.S. Provisional Patent Application Ser. No. 60/566,060, filed Apr. 28, 2004 by Daniel Mahgerefteh et al. for, A METHOD OF TRANSMISSION USING PARTIAL FM AND AM MODULATION; (iv) U.S. Provisional Patent Application Ser. No. 60/567,737, filed May 3, 2004 by Daniel Mahgerefteh et al. for ADIABATIC FREQUENCY MODULATION (AFM); (v) U.S. Provisional Patent Application Ser. No. 60/569,769, filed May 10, 2004 by Daniel Mahgerefteh et al. for FLAT CHIRP INDUCED BY AN OPTICAL FILTER EDGE, which patent applications are hereby incorporated herein by reference.

SUMMARY OF THE INVENTION

This invention provides an optical spectrum reshaper (OSR) which works in tandem with a modulated optical source which, by modifying the spectral properties of the modulated signal, results in extending the optical transmission length well beyond the dispersion limit. The OSR can be defined as a passive optical element that imparts an optical frequency dependent loss and frequency dependent phase on an input optical signal. This invention also provides a modulated laser source and an optical spectrum reshaper system that increases tolerance to fiber dispersion as well as converting a partially frequency modulated signal into a substantially amplitude modulated signal.

The optical spectrum reshaper (OSR) may be a variety of filters such as a Coupled Multicavity (CMC) filter to enhance the fidelity of converting a partially frequency modulated signal into a substantially amplitude modulated signal. The OSR may also partially compensate for the dispersion of the fiber. In one embodiment of the present invention, a modulated laser source may be provided that is communicatably coupled to an optical filter where the filter is adapted to lock the wavelength of a laser source as well as converting the partially frequency modulated laser signal into a substantially amplitude modulated signal.

In one form of the present invention, there is provided a fiber optic communication system comprising:
an optical signal source adapted to receive a base binary signal and produce a first signal, said first signal being frequency modulated; and
an optical spectrum reshaper adapted to reshape the first signal into a second signal, said second signal being amplitude modulated and frequency modulated;
characterized in that:
the frequency characteristics of said first signal, and the optical characteristics of said optical spectrum reshaper, being such that the frequency characteristics of said second signal are configured so as to increase the tolerance of the second signal to dispersion in a transmission fiber.

In another form of the present invention, there is provided an optical transmitter comprising:
a frequency modulated source for generating a first frequency modulated signal, and
an amplitude modulator for receiving the first frequency modulated signal and for generating a second amplitude and frequency modulated signal.

In another form of the present invention, there is provided a method for transmitting an optical signal through a transmission fiber comprising: receiving a base binary signal;
operating an optical signal source using the base binary signal to produce a first signal, said first signal being frequency modulated;
passing the frequency modulated signal through an optical spectrum reshaper so as to reshape the first signal into a second signal, said second signal being amplitude modulated and frequency modulated;
the frequency characteristics of said first signal, and the optical characteristics of said optical spectrum reshaper, being such that the frequency characteristics of said second signal are configured so as to increase the tolerance of the second signal to dispersion in a transmission fiber; and
passing the second signal through a transmission fiber.

In another form of the present invention, there is provided a method for transmitting a base signal, comprising:
using the base signal to produce a frequency modulated signal; and
providing an amplitude modulator for receiving the frequency modulated signal and for generating an amplitude and frequency modulated signal.

In another form of the present invention, there is provided a fiber optic communication system comprising:
an optical signal source adapted to produce a frequency modulated signal; and
an optical spectrum reshaper adapted to convert the frequency modulated signal into a substantially amplitude modulated signal;
characterized in that:
the operating characteristics of the optical signal source and the optical characteristics of the optical spectrum reshaper combine to compensate for at least a portion of a dispersion in an optical fiber.

In another form of the present invention, there is provided a method for transmitting an amplitude modulated signal through a fiber comprising:
providing a laser and providing a filter having selected optical characteristics;
inputting the amplitude modulated signal into the laser, and operating the laser, so as to generate a corresponding frequency modulated signal;
passing the frequency modulated signal through the filter so as to generate a resulting signal and passing the resulting signal into the fiber;

the laser being operated, and the filter being chosen, such that the resulting signal is configured to compensate for at least a portion of the dispersion in the fiber.

In another form of the present invention, there is provided a fiber optic communication system comprising:
an optical signal source adapted to produce a first signal, said first signal being frequency modulated; and
an optical spectrum reshaper adapted to convert said first signal into a second signal, said second signal being amplitude modulated and frequency modulated;
characterized in that:

the frequency characteristics of said first signal, and the optical characteristics of said optical spectrum reshaper, being such that the frequency characteristics of said second signal are configured so as to extend the distance said second signal can travel along a fiber before the amplitude characteristics of said second signal degrade beyond a given amount.

In another form of the present invention, there is provided a fiber optic communication system comprising:

a module adapted to receive a first signal and convert said first signal into a second signal, said second signal being amplitude modulated and frequency modulated;

characterized in that:

the frequency characteristics of said second signal are configured so as to extend the distance said second signal can travel along a fiber before the amplitude characteristics of said second signal degrade beyond a given amount.

In another form of the present invention, there is provided a system adapted to convert a first signal into a second signal, said second signal being amplitude modulated and frequency modulated;

the improvement comprising:

tailoring the frequency characteristics of said second signal so as to extend the distance said second signal can travel along a fiber before the amplitude characteristics of said second signal degrade beyond a given amount.

In another form of the present invention, there is provided a fiber optic communication system comprising:

an optical signal source adapted to receive a base signal and produce a first signal, said first signal being frequency modulated; and an optical spectrum reshaper adapted to convert said first signal into a second signal, said second signal being amplitude modulated and frequency modulated;

characterized in that:

the frequency characteristics of said first signal, and the optical characteristics of said optical spectrum reshaper, being such that the frequency characteristics of said second signal are configured so as to extend the distance said second signal can travel along a fiber before the amplitude characteristics of said second signal degrade beyond a given amount.

In another form of the present invention, there is provided a fiber optic communication system comprising:

an optical signal source adapted to produce a first signal, said first signal being frequency modulated; and an optical spectrum reshaper adapted to convert said first signal into a second signal, said second signal being amplitude modulated and frequency modulated;

characterized in that:

the frequency dependent loss of the optical spectrum reshaper is adjusted to increase the dispersion tolerance of the second signal.

In another form of the present invention, there is provided a fiber optic system comprising:

an optical source adapted to produce a frequency modulated digital signal;

characterized in that:

said digital signal has a time varying frequency modulation which is substantially constant across each 1 bit and equal to a first frequency and substantially constant over each 0 bit and equal to a second frequency, wherein the difference between said first frequency and said second frequency is between 0.2 times and 1.0 times the bit rate frequency.

In another form of the present invention, there is provided a method for generating a dispersion tolerant digital signal, comprising:

modulating a DFB laser with a first digital base signal to generate a first optical FM signal, wherein said first FM signal has a $\pi$ phase shift between 1 bits that are separated by an odd number of 0 bits, and modulating amplitude of said first optical FM signal with a second digital base signal to produce a second optical signal with high contrast ratio.

DETAILED DESCRIPTION OF THE PREFERRED EMBODIMENTS

Many modifications, variations and combinations of the methods and systems and apparatus of a dispersion compensated optical filter are possible in light of the embodiments described herein. The description above and many other features and attendant advantages of the present invention will become apparent from a consideration of the following detailed description when considered in conjunction with the accompanying drawings wherein like numbers refer to like parts and further wherein.

DETAILED DESCRIPTION OF THE PREFERRED EMBODIMENTS

In one embodiment of the present invention, the CML™ generates a digital optical signal having concomitant amplitude and frequency modulation, such that there is a special correlation between the optical phases of the bits. This phase correlation provides a high tolerance of the resulting optical signal to dispersion in the optical fiber; further extending the reach of the CML™.

Figure 1:
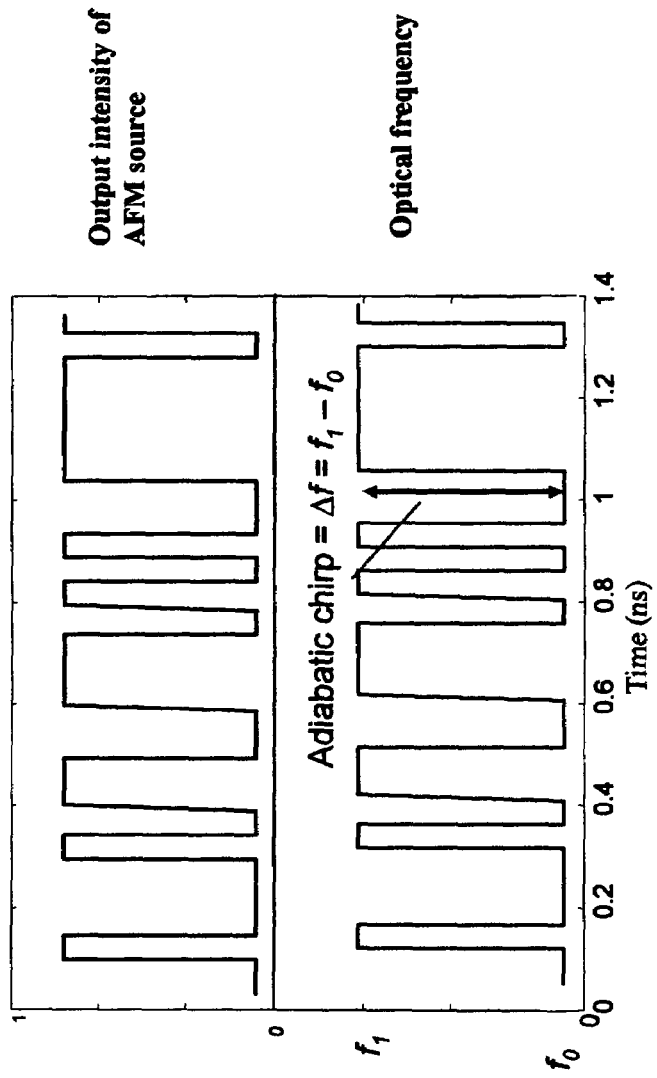
FIG. 1 illustrates an optical digital signal with concomitant amplitude modulation and frequency modulation (i.e., flat-topped chirp)
Figure 2:
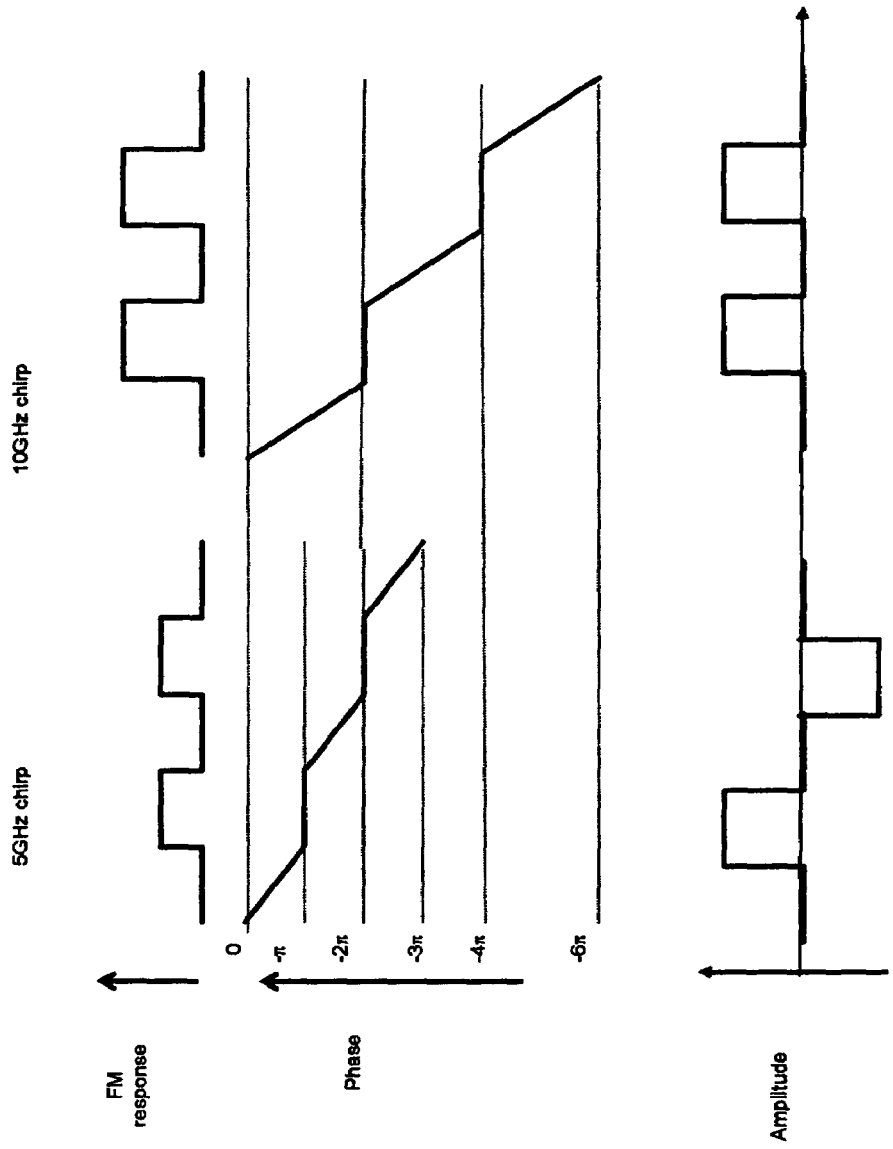
FIG. 2 illustrates the instantaneous frequency and phase of a 101 bit sequence for flat-topped chirp values of 5 GHz and 10 GHz for a 10 Gb/s digital signal.

In one preferred embodiment of the present invention, the CML™ consists of a directly modulated DFB laser and an optical spectrum reshaper (OSR). The distributed feedback (DFB) laser is modulated with an electrical digital signal, wherein a digital signal is represented by 1 bits and 0 bits. The DFB laser is biased high above its threshold, for example, at 80 mA, and is modulated by a relatively small current modulation; the resulting optical signal has amplitude modulation (AM), the 1 bits having larger amplitude than the 0 bits. The ratio of the amplitude of the 1 bits to the 0 bits is typically referred to as the extinction ratio (ER). Importantly, the modulated optical signal has a frequency modulation component, called adiabatic chirp, which is concomitant with the amplitude modulation and nearly has the same profile in time, an example of which is shown in FIG. 1. The extinction ratio (ER) of the optical output can be varied over a range depending on the FM efficiency of the laser, defined as the ratio of the adiabatic chirp to the modulation current (GHz/mA). A higher modulation current increases ER, as well as the adiabatic chirp.

The chirp property of directly modulated lasers has been known for some time. When the laser is modulated with an electrical digital signal, its instantaneous optical frequency changes between two extremes, corresponding to the 1s and 0s, and the difference in the frequency changes is referred to as adiabatic chirp. In addition to adiabatic chirp, which approximately follows the intensity profile, there are transient frequency components at the 1 to 0 and 0 to 1 transitions of the bits, called transient chirp. The magnitude of transient chirp can be controlled by adjusting the bias of the laser relative to the modulation current. In one embodiment of the present invention, the transient chirp component is minimized by using a high bias and small modulation. The signal is then passed through an optical spectrum reshaper (OSR), such as the edge of an optical band pass filter with a sharp slope. The OSR modifies the frequency profile of the input optical signal, generating a flat-topped and square shaped frequency profile such as that shown in FIG. 1. In the preferred embodiment of the present invention, the magnitude of the resulting flat-topped chirp is chosen to be such that it provides a special phase correlation between the bits, as described below. Given an FM efficiency value, $\eta_{FM}$, the desired adiabatic chirp, $\Delta v$ specifies the modulation current, $\Delta i = \Delta v / \eta_{FM}$, which in turn determines the extinction ratio, $$ER = 10\log\left(\frac{I_b - I_{th} + \Delta i}{I_b - I_{th} - \Delta i}\right),$$

where $I_b$ is the bias current, and $I_{th}$ is the threshold current of the laser. The magnitude of the flat-topped chirp after the OSR is determined by the magnitude of the adiabatic chirp at the output of the laser and the slope of the OSR. For a 10 Gb/s NRZ signal, for example, the desired adiabatic chirp is ~4.5 GHz, and the ER ~1 dB for a DFB laser with FM efficiency ~0.2 GHz/mA. Passing this optical signal through an OSR with average slope of approximately 2.3 dB/GHz increases this chirp magnitude to about 5 GHz. The significance of this value is the desired phase correlation between the bits as described below.

One important aspect of the present invention is the realization that as the frequency of an optical signal is changing with time, due to the chirp, the optical phase of the bits changes as well, depending on the bit period, rise fall times and the amount of chirp. It should be noted that when monitoring the optical carrier wave, which is a sine wave, it can be observed that at some point in time, phase is a particular position on the carrier wave. The phase difference between the crest of the wave and its trough, for example, is $\pi$. Frequency describes the spacing between the peaks; higher frequency means the waves are getting bunched up and more crests are passing by per unit time. Mathematically, phase is the time integral of optical frequency. When the laser is modulated by a digital signal with bit period T, the optical phase difference between two bits depends on the flat-topped chirp, as well as on the total time difference between the bits. This phase difference can be used to increase the propagation of the signal in the fiber as is shown in the following example.

An optical electric filed is characterized by an amplitude envelope and a time varying phase and a carrier frequency as follows:

$$E(t)=A(t)\exp(-i\omega_0 t+i\phi(t)) \quad (1)$$

where A (t) is the amplitude envelope, $\omega_0$ is the optical carrier frequency, and $\phi(t)$ is the time varying phase. For example, for a chirp-free, or so-called transform limited, pulse, the time varying phase is zero. The instantaneous frequency is defined by the following equation:

$$f(t) = -\frac{1}{2\pi}\frac{d\phi(t)}{dt} \quad (2)$$

Note that the negative sign in Equation 2 is based on the complex notation convention that takes the carrier frequency to be negative frequency. Hence the optical phase difference between two time points on the optical filed is given by:

$$\Delta\phi = \phi(t_2) - \phi(t_1) = 2\pi\int_{t_1}^{t_2} f(t)\,dt \quad (3)$$

Let's consider a 101 bit sequence at the output of a CML™ having a certain magnitude flat-topped chirp. Taking the frequency of the 1 bits as a reference frequency, we obtain the plot shown below in two cases for a 10 Gb/s digital signal (100 ps pulse duration) for flat-topped chirp values of 5 GHz and 10 GHz. The pulses are assumed to have ideal square shape amplitudes and flat-topped chirp with 100 ps duration. Significantly, for 5 GHz of flat-topped chirp there is a π phase shift between the two 1 bits separated by a single zero.

$$\Delta\phi = 2\pi \times 5 \text{ GHz} \times 100 \, ps = \pi \quad (4)$$

Following Equations 3 and 4, the phase shift is 2π between two 1 bits separated by two 0 bits, and 3π for two 1 bits separated by three 0 bits and so on. In general, two 1 bits separated by an odd number of 0 bits are π out of phase for 5 GHz of chirp, and a 10 Gb/s signal. For 10 GHz of chirp and 10 Gb/s square pulses the 1 bits separated by odd number of bits are in phase; i.e. phase difference is 2π.

Figure 3:
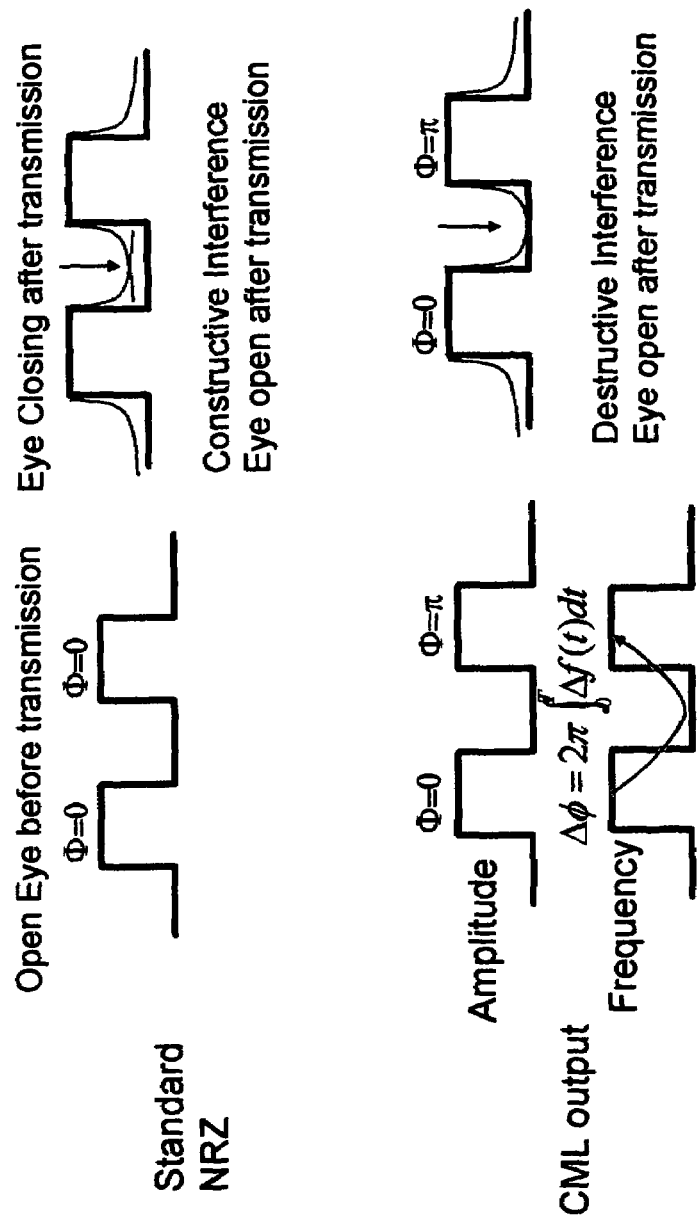
FIG. 3 illustrates a 101 bit sequence with (CML output) and without (Standard NRZ) flat-topped chirp before and after propagation.

The significance of this phase shift is realized when the 101 bit sequence with 5 GHz of flat-topped chirp is propagated through dispersive fiber, where each pulse broadens due to its finite bandwidth. FIG. 3 shows that the π phase shift causes the two bits to interfere destructively at the center of the 0 bit, therefore keeping the 1 and 0 bits distinguishable by the decision circuit at the receiver. The decision threshold chooses a threshold voltage above which all signals are counted as 1 and below which they are counted as 0 bits. Hence, the phase shift helps differentiate between the 1 and 0 bits and the pulse broadening does not reduce the BER for this bit sequence. Therefore, the π phase shift constructed, based on the preferred embodiment of the present invention, increases tolerance to dispersion. For intermediate chirp values, there is partial interference, which is enough to extend transmission distance, but not to distances in the case described above.

Optical Spectrum Reshaping

In one embodiment of the present invention, the FM modulated signal generated is passed though an optical spectrum reshaper so as to change the instantaneous frequency profile of the signal across the 1 and 0 bits in such a way so as to increase the tolerance of the signal to dispersion. In the prior art, such as UK Patent No. GB 2107147A by R. E. Epworth, the signal from the FM source is filtered to produce an intensity modulation, which is higher modulation depth after passing through the filter than that before passing through the filter. In the present invention, optical spectrum reshaping, rather than increase in amplitude modulation alone, can be achieved using an optical spectrum reshaper (OSR). In one embodiment of the present invention, the instantaneous frequency profile of the output signal is modified across its bits after the OSR, so as to increase the distortion free propagation distance.

In a preferred embodiment of the present invention, a semiconductor laser is directly modulated by a digital base signal to produce an FM modulated signal with adiabatic chirp. The output of the laser is then passed through an OSR, which, in this example, may be a 3 cavity etalon filter used at the edge of its transmission. The chirp output of a frequency modulated source, such as a directly modulated laser, is adiabatic. This means that the temporal frequency profile of the pulse has substantially the same shape as the intensity profile of the pulse.

In a preferred embodiment, the OSR converts the adiabatic chirp to flat-topped chirp, as described in U.S. Provisional Patent Application Ser. No. 60/554,243, filed Mar. 18, 2004 by Daniel Mahgerefteh et al. for FLAT CHIRP INDUCED BY FILTER EDGE, which patent application is hereby incorporated herein by reference.

Figure 4:
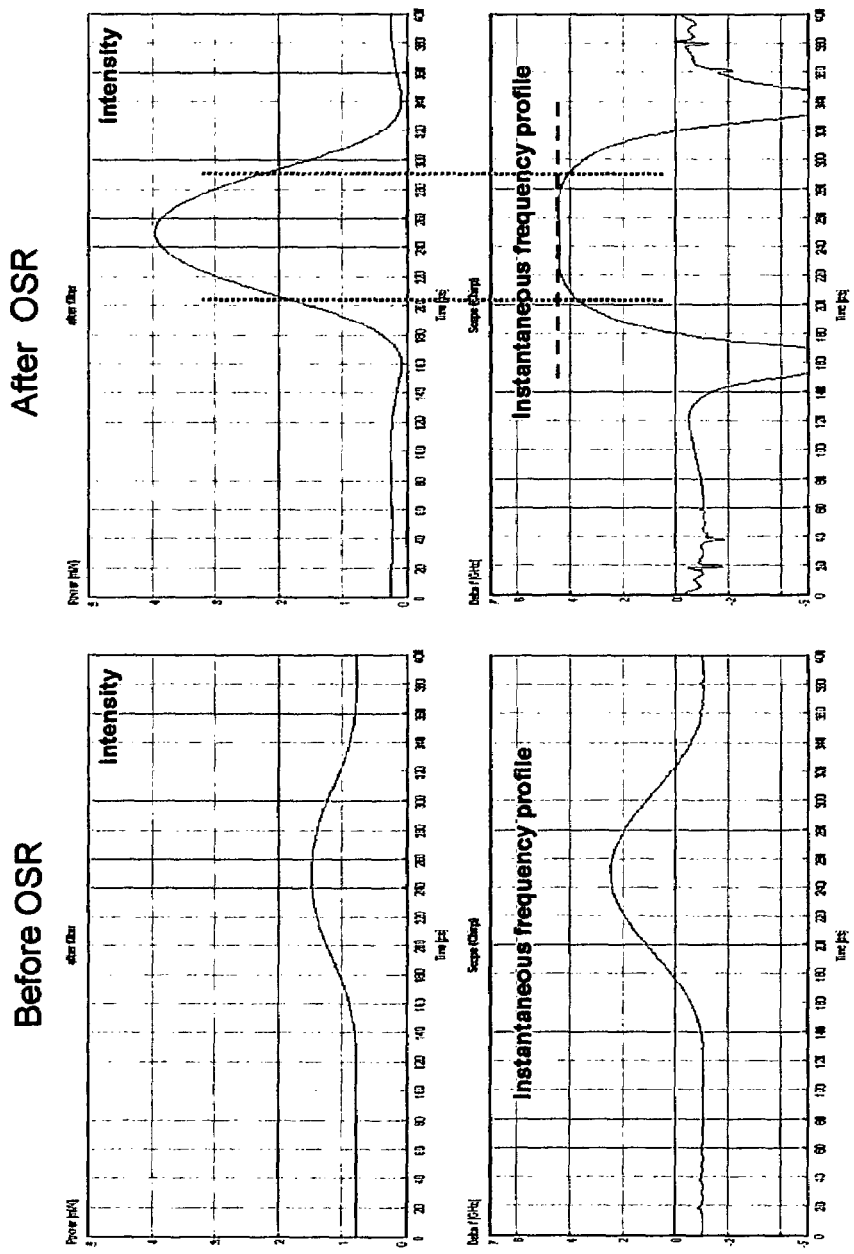
FIG. 4 illustrates a Gaussian pulse with adiabatic chirp profile before an OSR and the resulting pulse shape and flat-topped chirp after an OSR.

FIG. 4 shows the optical intensity and the instantaneous frequency profile of a Gaussian pulse before and after an OSR. The Gaussian pulse has adiabatic chirp before the OSR, i.e., its instantaneous frequency profile has the same Gaussian shape as its intensity profile. After the OSR, both the amplitude and instantaneous frequency profiles are altered. The ratio of peak power-to-power in the background (extinction ratio) is increased, and the pulse narrows slightly in this example. An important aspect of the present invention is the flat-topped instantaneous frequency profile resulting from passage through the OSR, indicated by the dotted horizontal green line in FIG. 4. The flat-topped chirp is produced when the spectral position of the optical spectrum of the signal is aligned with the edge of the OSR transmission. The optimum position depends on the adiabatic chirp and the slope of the OSR transmission edge.

Figure 5:
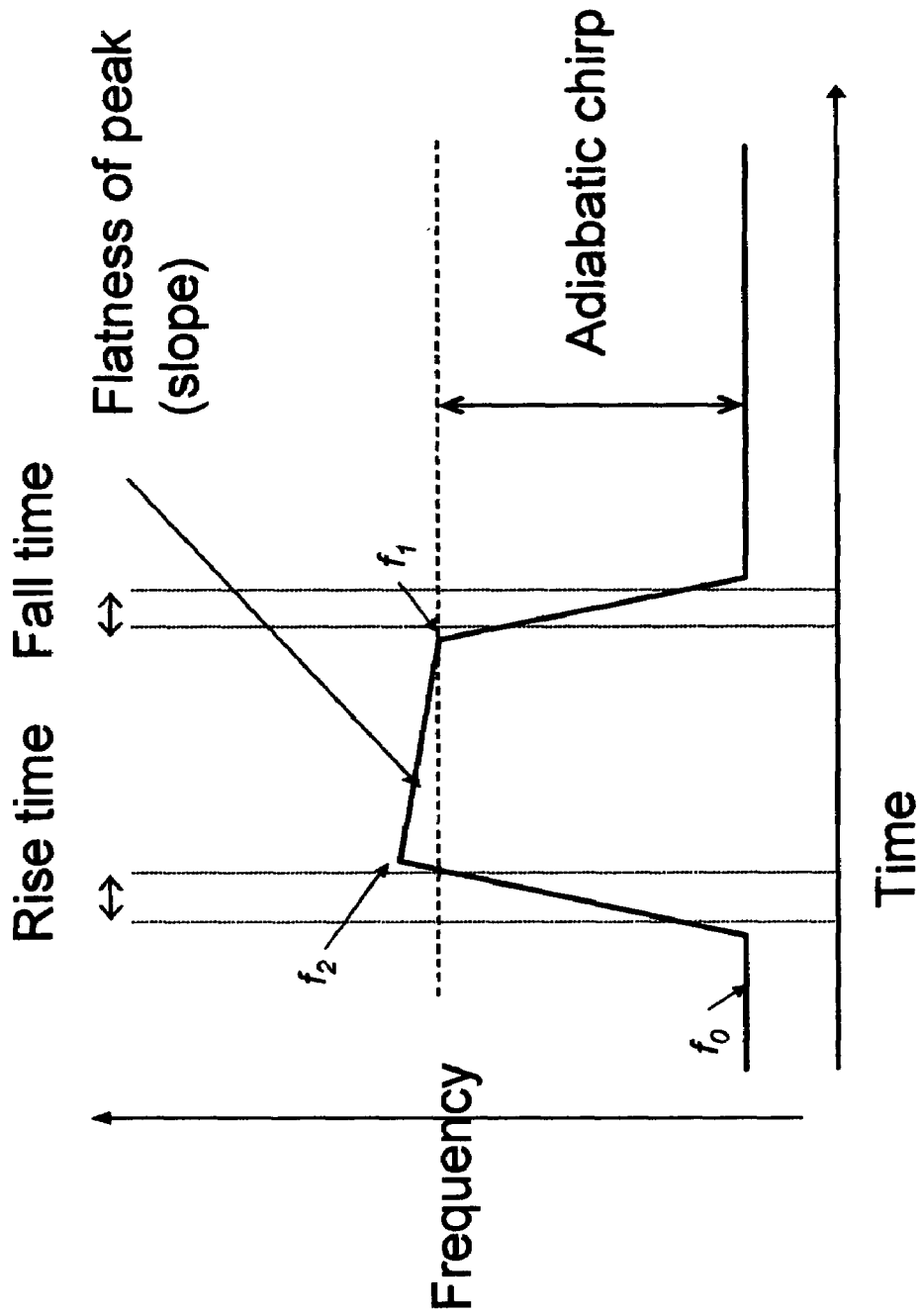
FIG. 5 illustrates the instantaneous frequency profile of the pulse and definitions of the pulse.

The instantaneous frequency profile of a flat-topped chirp pulse is characterized by a rise time, a fall time, duration and a slope of the flat-top, and a flat-topped chirp value as shown in FIG. 5. The slope, in turn, can be defined by the two frequency values $f_2$ and $f_1$. In an embodiment of the present invention the rise time, fall time, duration, and slope of the top-hat portion of the frequency profile are adjusted relative to the rise time, fall time, duration of the amplitude profile, in order to increase the transmission distance of the signal beyond the dispersion limit.

Figure 6:
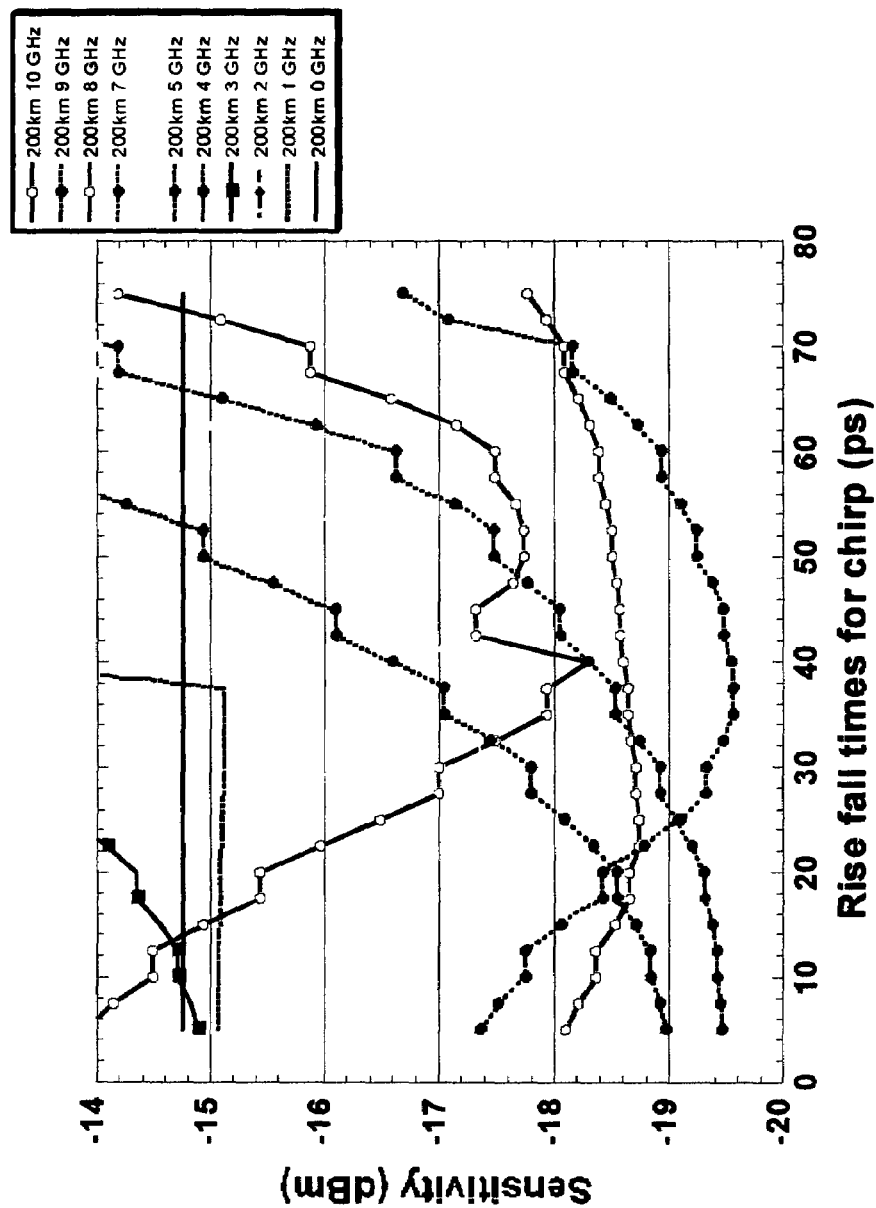
FIG. 6 illustrates the receiver sensitivity after 200 km as a function of the rise times and fall times of the instantaneous frequency profile.

The importance of reshaping the instantaneous frequency profile of the pulses can be realized by simulation which shows the bit error rate of such a spectrally reshaped 10 Gb/s pulse after propagation though 200 km of dispersive fiber having 17 ps/nm/km dispersion. FIG. 6 shows that for a given flat-topped chirp value as measured in the instantaneous frequency profile of the signal after the OSR. In such a case, the BER sensitivity can be optimized by varying the rise time and fall time. Also, for a given rise time and fall time of the instantaneous frequency profile, the chirp value can be varied over a range from 3 GHz to 10 GHz in order to achieve a desired BER sensitivity after propagation through fiber.

The following conclusions can be drawn from this example calculation:

(i) the optimum adiabatic chirp after the OSR is 5 GHz, with short rise time and fall time for the instantaneous frequency profile; this achieves the lowest sensitivity after fiber propagation;

(ii) any chirp in the range of 3-10 GHz can be used to extend transmission relative to the case of no chirp. The rise time and fall times have to be adjusted based on the adiabatic chirp value. In the above example, a rise time and fall time of <30 ps is always optimum; and (iii) the rise time and fall time of the instantaneous frequency can be reduced by increasing the slope in dB/GHz of the transmission profile of the OSR. Slope of top-hat portion of the frequency profile is determined by the dispersion of the OSR and provides further dispersion tolerance.

Figure 7:
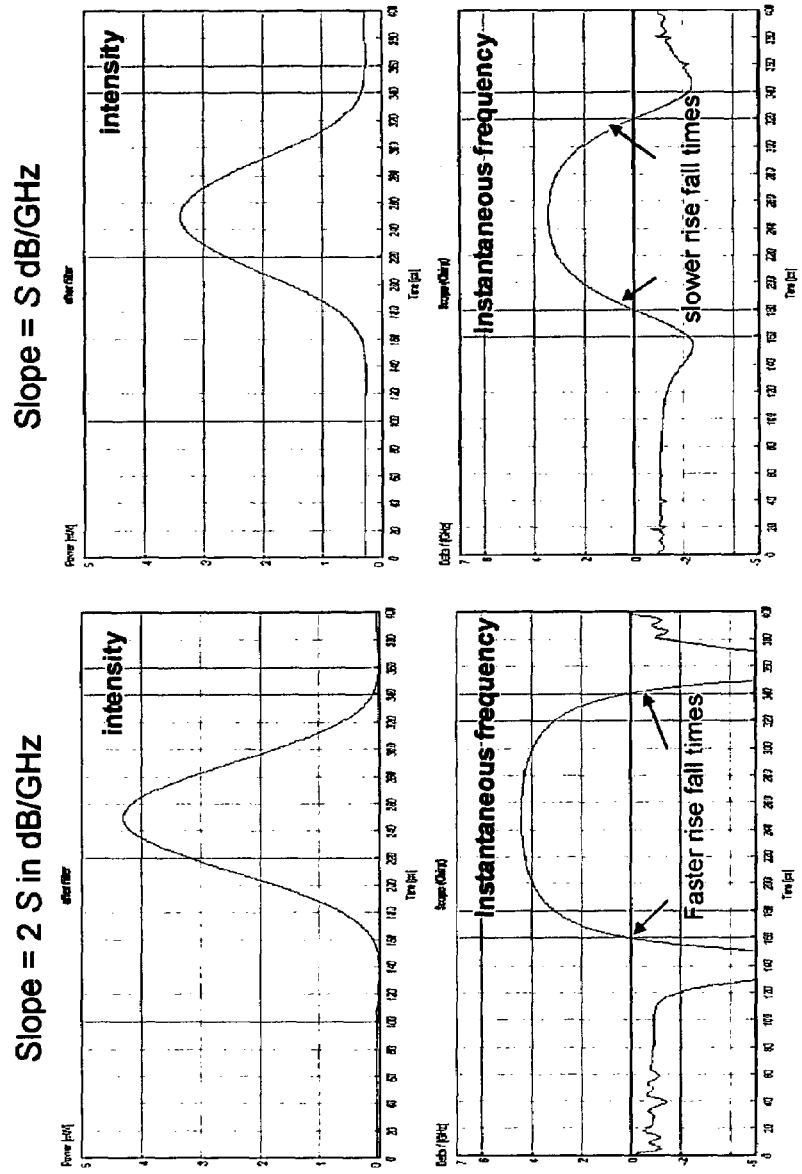
FIG. 7 illustrates the instantaneous frequency profile and intensity profile after an OSR with two different slopes.

FIG. 7 shows another example, where the rise time and fall time of the instantaneous frequency profile are reduced after the OSR by increasing the slope in dB/GHz of the OSR, here by a factor of 2. In one embodiment of the present invention, the output of a frequency modulated signal is passed through an OSR and the rise time and fall time of the frequency profile are reduced by increasing the slope (in dB/GHz) of the OSR.

Spectral Narrowing

Figure 8:
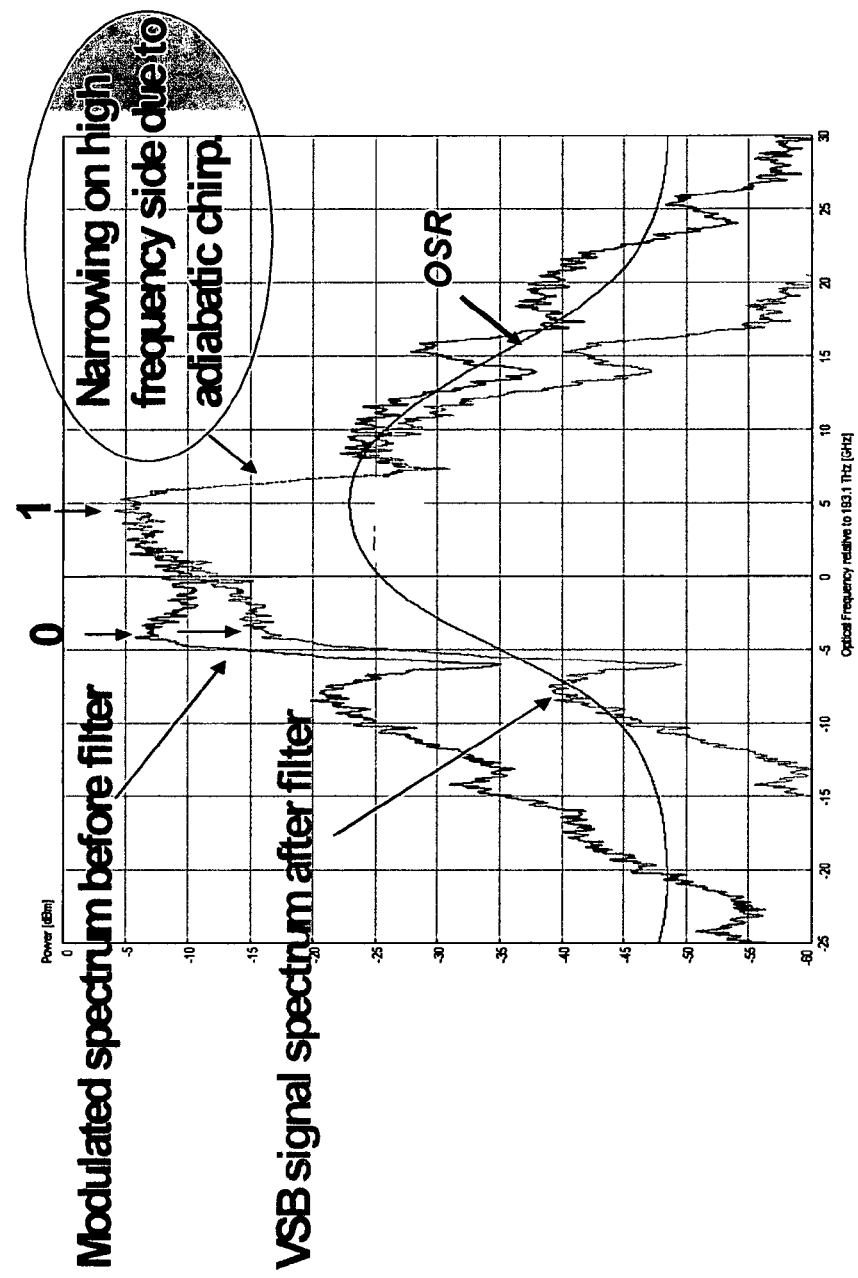
FIG. 8 illustrates the optical spectrum of an adiabatically chirped signal, the spectrum of the OSR, and the resulting reshaped spectrum.

Simultaneous frequency modulation and amplitude modulation with the same digital information reduces the optical bandwidth of the signal and suppresses the carrier frequency. This effect is most marked for a chirp value that is ½ the bit rate frequency; i.e., 5 GHz chirp for 10 Gb/s. This corresponds to the phase change of 0 to π between 1 bits separated by an odd number of 0 bits, i.e., optimum correlation between the phases of the otherwise random bit sequence. For an approximate range of chirp values between 20% to 80% of the bit rate frequency (2-8 GHz for 10 Gb/s bit rate) the carrier is significantly suppressed and the spectrum is narrowed. For 0 value of chirp or for chirp equal to the frequency of the bit rate frequency, the carrier is present and the spectrum broadens again. This is because the phase of all the pulses becomes equal for these two cases and the phase correlation is lost. As shown in FIG. 8, the narrowing of the spectrum by application of amplitude modulation and frequency modulation narrows the spectrum on the high frequency side. Note that in this example the chirp is ~7.5 GHz for 10 Gb/s. The spectral position of the signal relative to the peak transmission of the OSR is adjusted such that the spectrum in on the low frequency edge of the OSR. This further reduces the spectral width on the low frequency side. Reducing the spectral bandwidth extends the transmission distance.

In one embodiment of the present invention the Bandwidth (BW) of the OSR is less than the bit rate. The spectrum of a digital signal is determined by the product of the spectrum of the digital information and the Fourier transform of the pulse shape. Using the correct amount of FM modulation (5 GHz of chirp for 10 Gb/s data rate) which gives a π phase shift between 1 bits separated by odd number of 0 bits as prescribed above, reduces the information BW. In order to increase tolerance to dispersion it is still necessary to reduce the spectrum of the pulse shape. This is done by a bandwidth limiting OSR in the preferred embodiment of the present invention.

FIG. 8 shows that for a given value of adiabatic chirp, the spectral position of the signal relative to the peak transmission of the OSR can be adjusted to increase the transmission distance. FIG. 8 shows the sensitivity for a 10 Gb/s signal at the transmitter (Back-back) and after propagation through 200 km of fiber having 17 ps/nm/km of dispersion as a function of the spectral shift relative to the OSR. Sensitivity is defined as the average optical power (in dBm) required to achieve a bit error rate of $10^{-12}$. The OSR in this example is a 3 cavity etalon. It is therefore an embodiment of the present invention to adjust the adiabatic chirp of the frequency modulated source as well as the spectral position of the resulting spectrum relative to the OSR in order to achieve a desired bit error rate after propagation through dispersive fiber.

Figure 9:
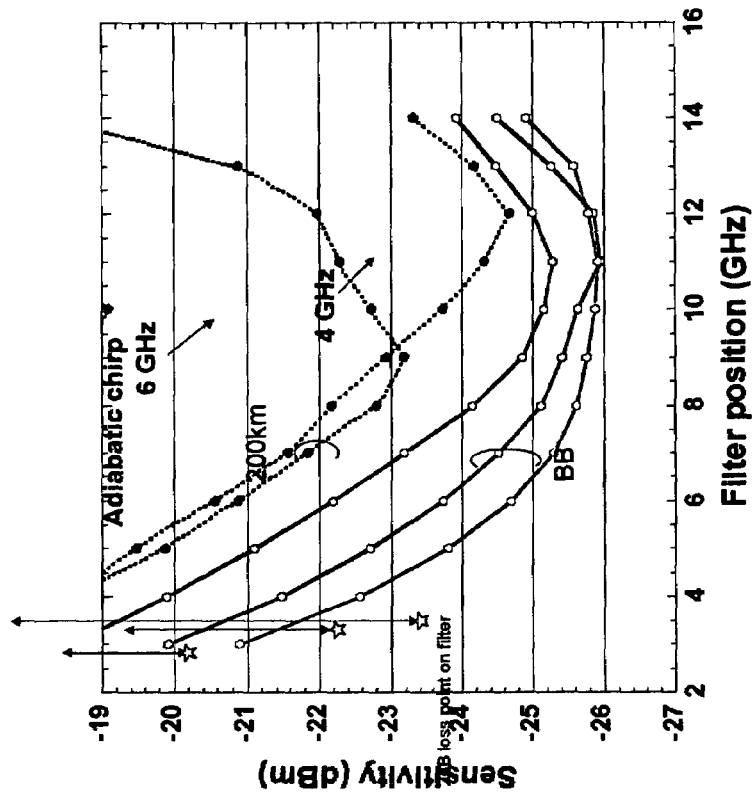
FIG. 9 illustrates receiver sensitivity after 200 km of 17 ps/nm/km fiber for various values of adiabatic chirp, and the spectral shift of signal relative to the OSR, which in this example is a 3 cavity etalon filter.
Figure 10:
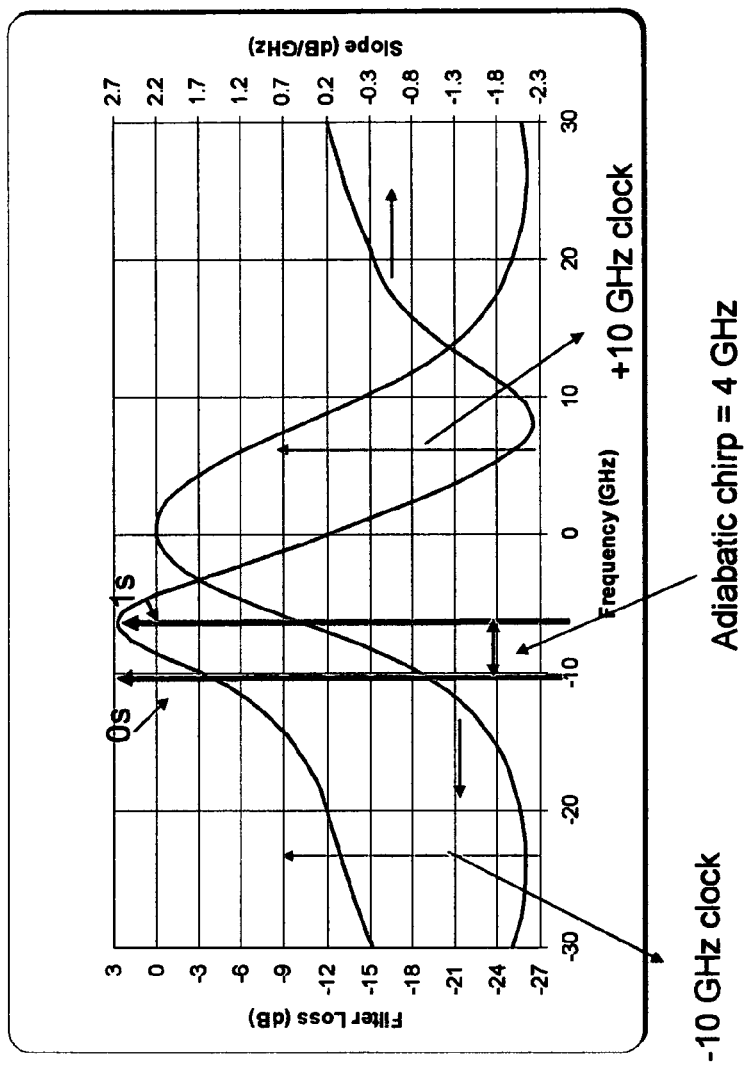
FIG. 10 illustrates an example of a non-Gaussian OSR and the spectral position of the signal relative to the OSR spectrum.

FIG. 9 shows an example of an OSR, formed by a non-Gaussian shaped band pass filter. FIG. 9 shows the transmission profile in dB scale as well as the derivative, or frequency dependent slope, of the OSR. FIG. 9 also shows the spectral position of the input FM signal to be reshaped. It is a preferred embodiment of the present invention that the optimal spectral position of the FM signal on the OSR be such that the 1s peak frequency be near the peak logarithmic derivative of the transmission profile of the OSR. In this example, the derivative is not linear on the dB scale, indicating that the OSR has a non-Gaussian spectral profile. A Gaussian OSR would have a linear slope as a function of frequency. FIG. 9 also shows the position of the clock frequency components of the input FM signal, which are reduced substantially after the OSR. This in-turn reduces the clock frequency components in the RF spectrum of the resulting second signal after the OSR. In this example, the peak slope is 2.7 dB/GHz, and the 3 dB bandwidth of the OSR in this case is approximately 8 GHz.

It is an embodiment of the present invention for the OSR to also reduce the clock frequency components, 10 GHz for a 10 Gb/s NRZ signal, in the RF spectrum of the signal resulting after the OSR.

The optimum OSR shape is one for which the transmitter has good performance both at its output (Back-to-back) as well as after transmission. The back-to-back performance is determined by having minimum distortion of the bits in the eye diagram, while after transmission performance is determined by a low dispersion penalty. As described in U.S. Provisional Patent Application Ser. Nos. 60/554,243 and 60/629,741, which patent applications are hereby incorporated herein by reference, a certain value of filter slope is required to convert an adiabatically chirped input signal to one having flat-topped chirp. It was shown that the OSR converts the first derivative of the amplitude of the input pulse to blue shifted transient chirp at the edges. For an optimum value of slope the added transient chirp increases the chirp at the edges to produce a nearly flat top chirp.

Figure 11:
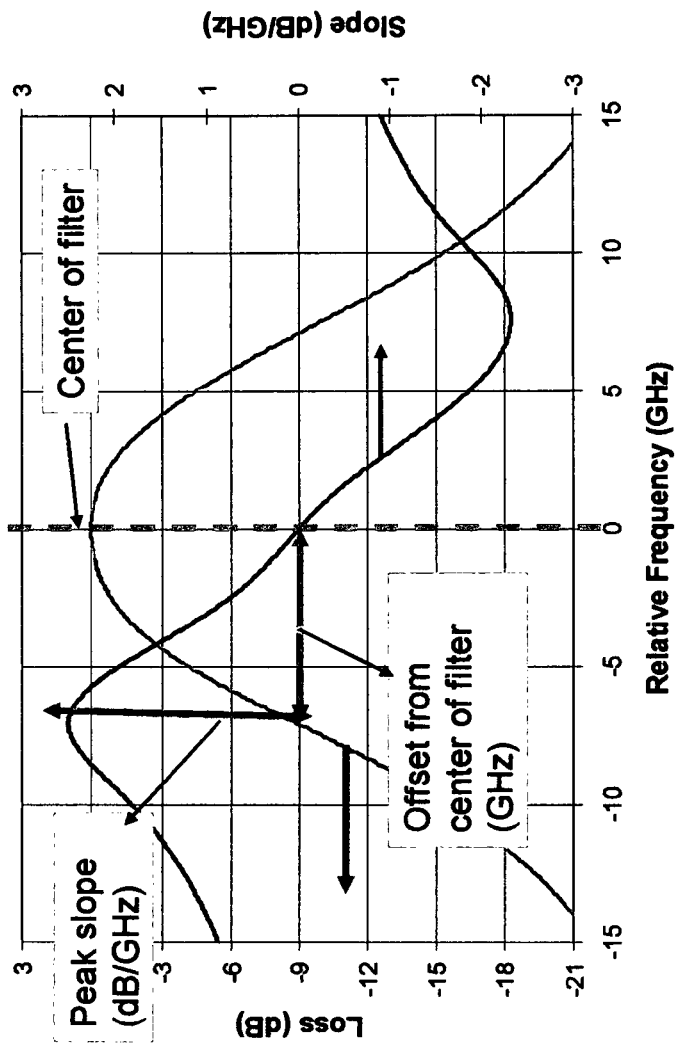
FIG. 11 illustrates the definition of slope of slope on an OSR.

U.S. Provisional Patent Application Ser. Nos. 60/554,243 and 60/629,741 disclose that a significant parameter of the OSR is the slope of its slope. As defined in the present invention, slope of slope (SoS) is the ratio of the peak logarithmic derivative of the transmission (in dB/GHz) to the frequency offset of this peak form the transmission peak (in GHz), as illustrated in FIG. 11. In one embodiment of the present invention, the slope of slope of an OSR is adjusted to optimize both the back-to-back transmitter BER and to reduce the BER after fiber transmission. For example, for a 10 Gb/s transmitter good back-to-back eye diagram, as well as low BER after transmission is obtained if the slope of slope is approximately in the range of 0.38 dB/GHz$^2$ to 0.6 dB/GHz$^2$. In addition the slope of the OSR near the center of the transmission needs to be approximately linear. Deviations from linearity introduce distortions in the resulting output eye diagram and thus cause increased bit error rate. A linear slope corresponds to a round-top shape filter. So, for example, a flat-topped filter, which has a near zero slope near the center is not desirable. The 3 dB band width of the band-pass OSR has to be in the range of 65% to 90% of the bit rate.

Figure 12:
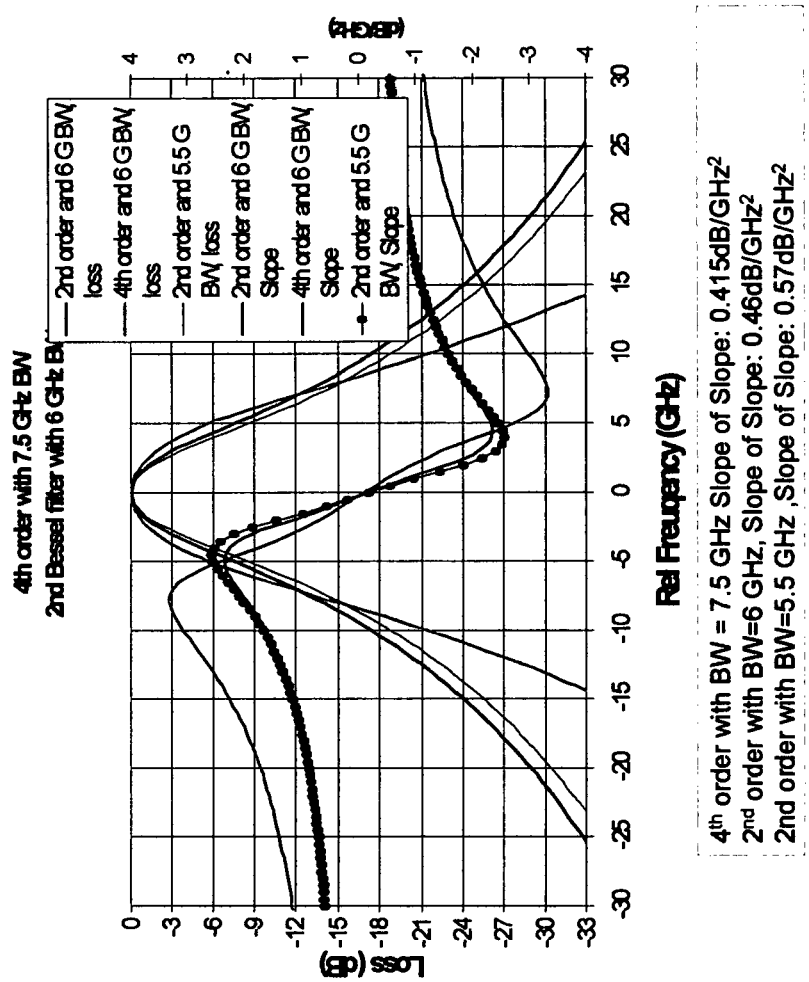
FIG. 12 illustrates Bessel filters used as OSR provide the desired slope of slope.

Two examples of such OSRs, as shown in FIG. 12, are $2^{nd}$ order Bessel filters having a 6 GHz or 5.5 GHz band widths. The $2^{nd}$ order Bessel filter shape is well known to the skilled in the art and is described mathematically by $$T(p) = \frac{1}{3 + 3p + p^2} \quad (6)$$

where p=2if/Δf$_{3\ dB}$. Here T is the field transmission, f is the optical frequency offset from the center of filter, and Δf$_{3\ dB}$ is the 3 dB band width of the filter. The measured quantity is the optical transmission of the filter, which is the absolute square of the field transmission in Eq. 6, |T(p)|$^2$ and is plotted in FIG. 12. The Bessel filter is usually used as an electrical low pass filter because it minimizes distortion in its pass band. In one embodiment of the present invention, the Bessel filter is an optical filter, and it is chosen because it provides the desired slope of slope and linear slope near its peak transmission. The slope of slope for the $2^{nd}$ order Bessel filter with a 6 GHz bandwidth is 0.46 dB/GHz$^2$, and the slope of slope for the 5.5 GHz bandwidth $2^{nd}$ order Bessel filter is 0.57 dB/GHz$^2$. These examples show that the bandwidth of the filter can be adjusted to change SoS to be the desired value.

Another example of a filter that can be used in accordance with the present invention is a $4^{th}$ order Bessel filter with a band width of 7.5 GHz, also shown in FIG. 12. This OSR has a slope of slope of 0.41 dB/GHz$^2$. The field transmission of the $4^{th}$ order Bessel filter is given as a function of the normalized frequency by $$T(p) = \frac{1}{15 + 15p + 6p^2 + p^3} \quad (7)$$

Figure 13:
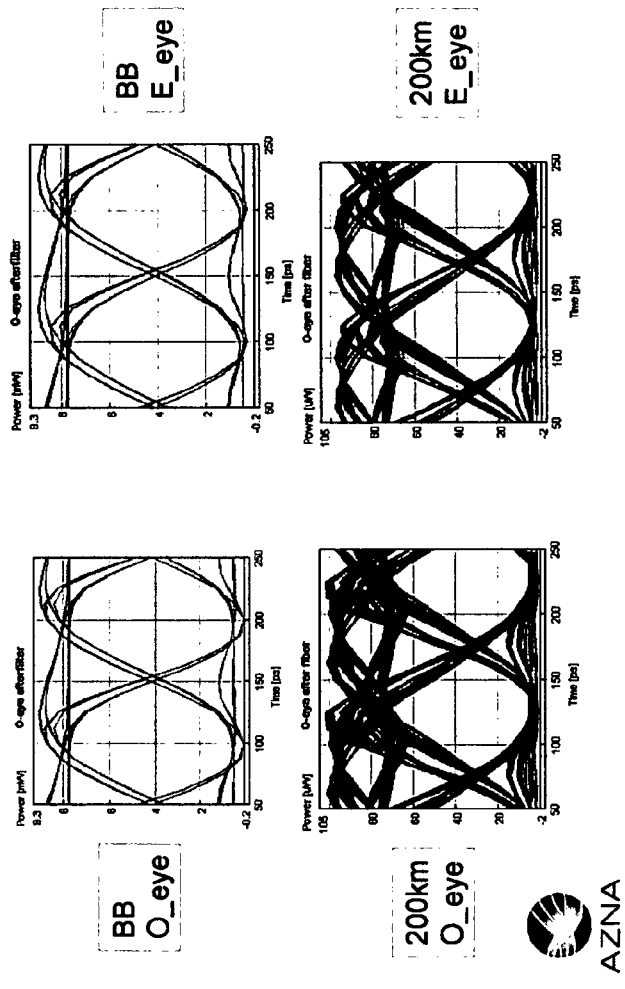
FIG. 13 illustrates optical and electrical eye diagrams before and after transmission through 200 km (3400 ps/nm) of fiber.

FIG. 13 shows examples of calculated eye diagrams for back-back and after 200 km of fiber having 3400 ps/nm dispersion. In this example, the $2^{nd}$ order Bessel filter with 5.5 GHz bandwidth was used. The eye diagrams on the left column are the back-back optical eye (so-called O-eye) of transmitter (top) and the eye transmitted after 200 km (3400 ps/nm). The eye diagrams on the right column are the eye diagrams measured after an optical to electrical converter with a typical ~8 GHz band width, which is called electrical eye (E-eye). The electrical eye is that at the output of the receiver, which converts the optical to electrical signal and provides it to the decision circuit for distinguishing the 1 and 0 bits.

Figure 14:
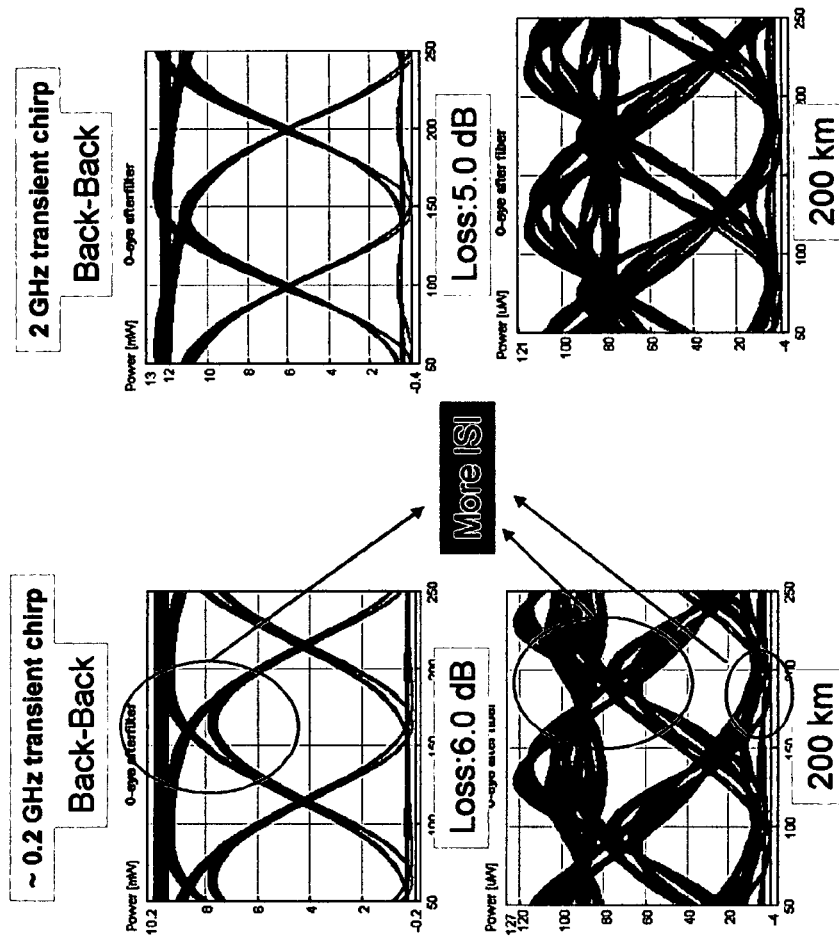
FIG. 14 illustrates eye diagrams for back-back and after 200 km of fiber for a chirp managed laser (CML™) transmitter with transient chirp at the output of the laser.

A directly modulated laser produces transient chirp, which occurs at the 1 to 0 and 0 to 1 bit transitions, in addition to adiabatic chirp. In a conventional directly modulated laser, transient chirp is detrimental as it hastens pulse distortion and increases BER after transmission. However, in the present invention, it has been found that when used as the FM source, where the directly modulated laser is followed by an OSR, some transient chirp at the output of the laser is desirable. FIG. 14 shows the results of simulation of a transmitter in accordance with the present invention. In this example, the adiabatic chirp of the laser is 4.5 GHz and the OSR is a 2 cavity etalon filter operated near its transmission edge.

FIG. 14 shows the eye diagrams of a 10 Gb/s transmitter at its output (back-back), as well as the eye after propagation through 200 km of fiber with 3400 ps/nm dispersion. The transient chirp at the output of the laser, before the OSR, is either nearly zero (~0.2 GHz) (left column) or 2 GHz (right column). Looking at FIG. 14, it is clear that the case having 2 GHz transient chirp produces a less distorted eye back to back. The eye after 200 km of fiber is also more open and has less inter-symbol interference (ISI) in the case having 2 GHz transient chirp. It is, therefore, one embodiment of the present invention to adjust the transient chirp of the frequency modulated source as well as the slope of slope of the optical spectrum reshaper to obtain the desired transmitter output having minimum distortion and to increase the error free propagation length of the transmitter beyond the dispersion limit.

Figure 15:
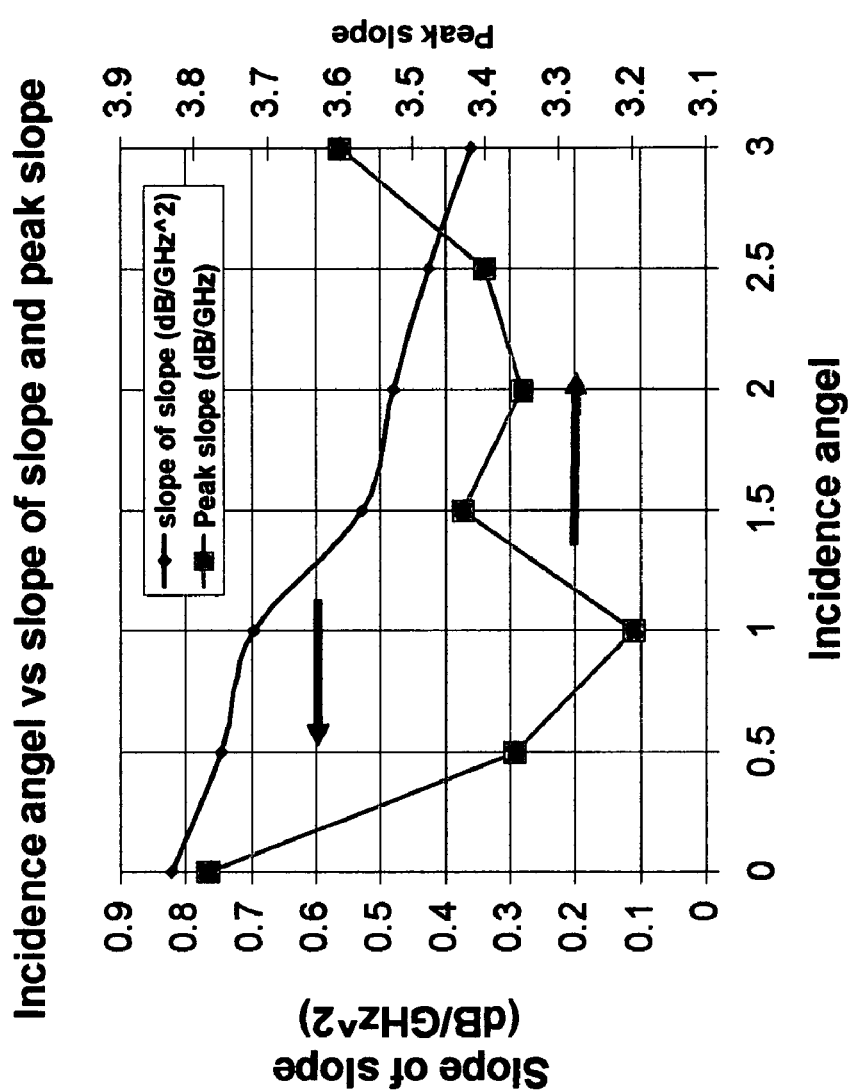
FIG. 15 illustrates measured slope and slope of slope for a 2 cavity etalon.

In practice, an optical filter such as a multicavity etalon may not have the desired transmission shape and slope of slope. Therefore, in another embodiment of the present invention, the angle of incidence and the beam divergence of the optical signal impinging upon the filter are adjusted to obtain the desired SoS. FIG. 15 shows an example of the measured slope as well as slope of the slope as a function of angle of incidence for a 2 cavity etalon. The peak slope initially decreases for increasing angles, reaches a minimum, and then increases again. The increase in slope at large angles is caused by spatial filtering, as described in U.S. Provisional Application Ser. No. 60/621,755, filed Oct. 25, 2004 by Oct. 25, 2004 et al. for SPECTRAL RESPONSE MODIFICATION VIA SPATIAL FILTERING WITH OPTICAL FIBER, which patent application is hereby incorporated herein by reference. For the same range of angles the slope of slope monotonically decreases from 0.75 dB/GHz$^2$ to 0.35 dB/GHz$^2$ because the peak position is increasing with increasing angle. In this example, the optimum value of 0.45 dB/GHz$^2$ is obtained by adjusting the angle of incidence to 1.5 to 2 degrees.

Figure 16:
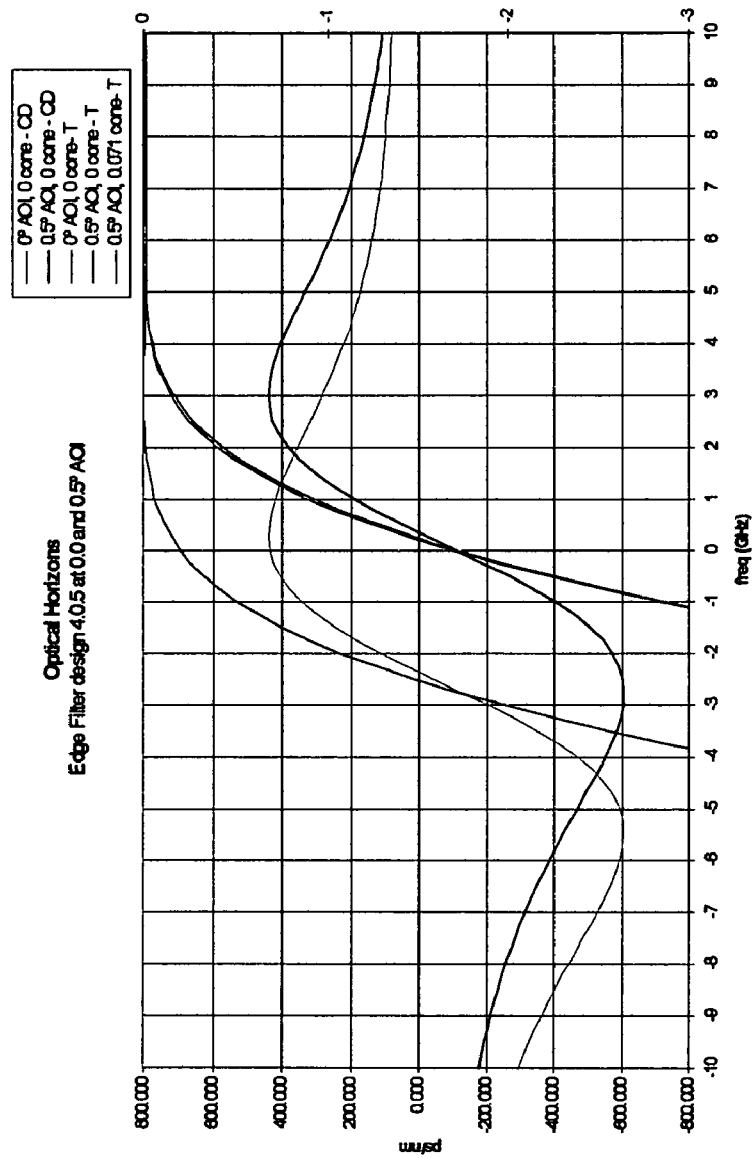
FIG. 16 illustrates transmission and slope of an edge filter used as an OSR.

In the above described examples, the optical spectrum reshaper (OSR) was a multicavity etalon filter. In another preferred embodiment of the present invention the OSR may be an edge filter, as shown in FIG. 16. The edge filter has a substantially flat transmission with frequency over a frequency range and a sharp edge on one side of the peak transmission. The position of the first optical signal in this case will be substantially on the slope of transmission.

OSR Dispersion

Figure 17:
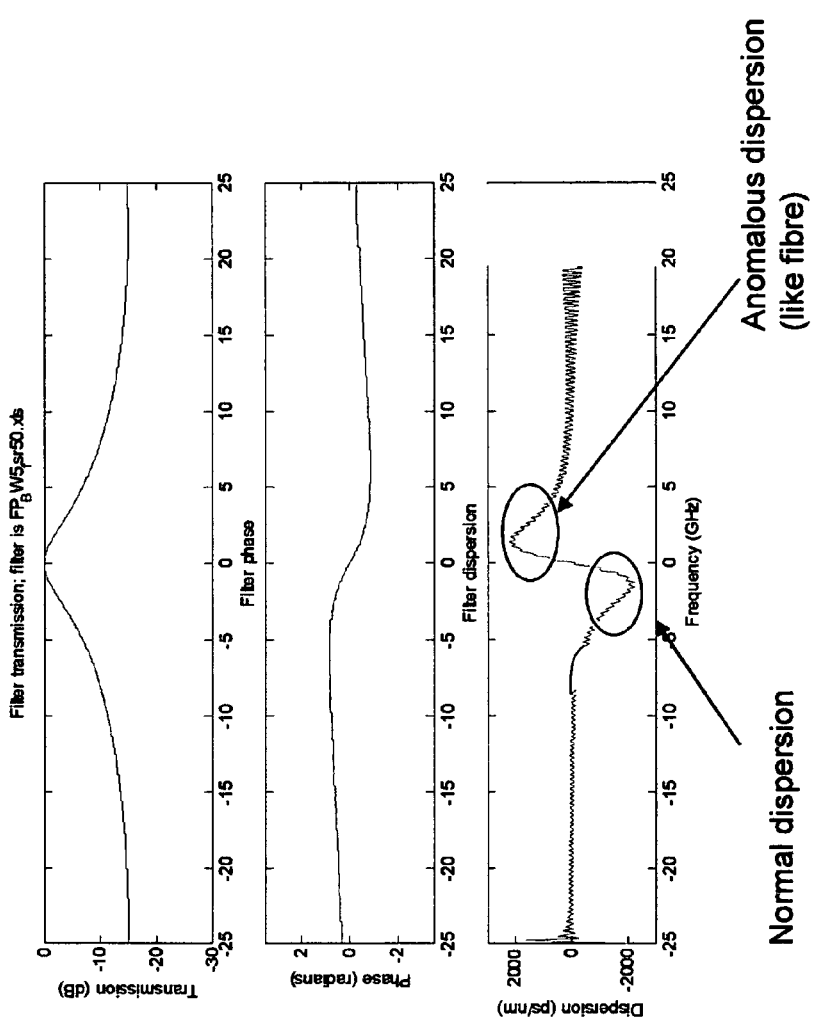
FIG. 17 illustrates an example of an OSR with its dispersion profile.

The OSR can also provide some dispersion compensation as well as the spectral reshaping. FIG. 17 shows the transmission characteristics of a filter and its corresponding dispersion profile.

Figure 18:
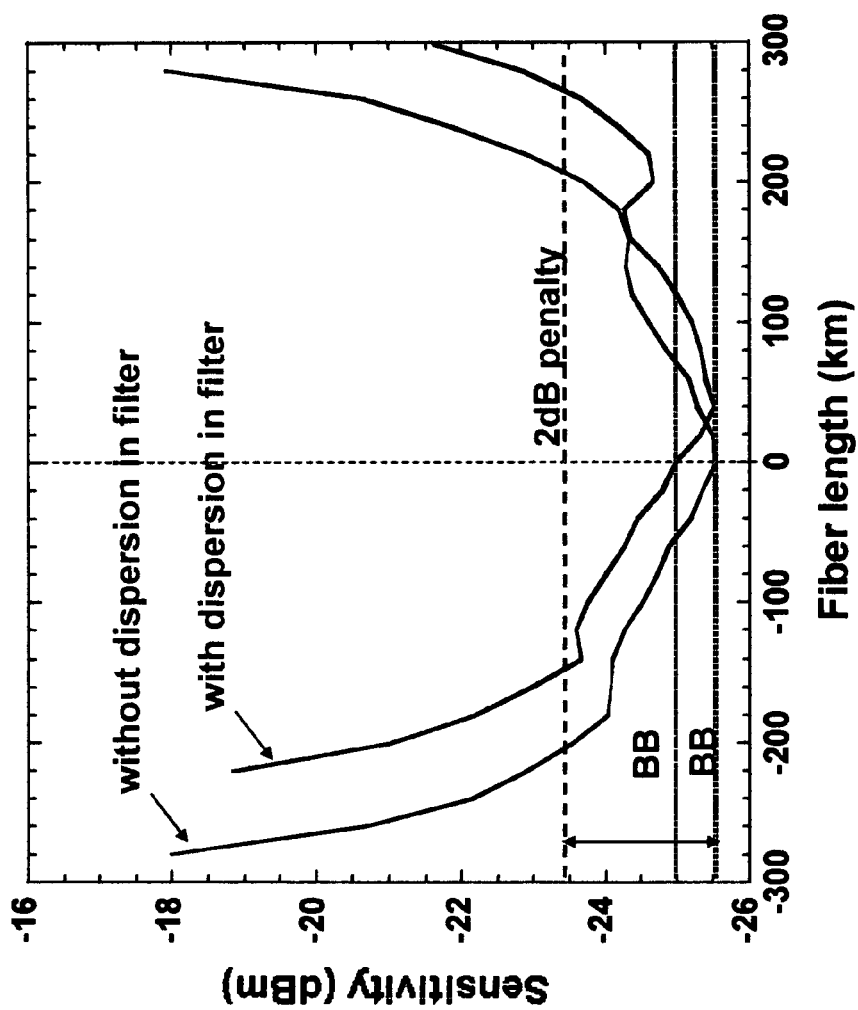
FIG. 18 illustrates sensitivity versus fiber length of dispersion in 17 ps/nm/km fiber with and without dispersion of the OSR taken into account.

The filter dispersion can compensate for a portion of the fiber dispersion. For example, if the laser frequency spectrum substantially overlaps with the normal dispersion peak, having a negative dispersion, the transmission for a standard single fiber having positive dispersion is extended. If the laser frequency spectrum substantially overlaps with the anomalous dispersion peak, where dispersion is positive, it reduces the transmission distance for a standard fiber with positive dispersion, but extends the reach over negative dispersion fiber such as Dispersion Compensating Fiber (DCF). FIG. 18 shows the sensitivity as a function of fiber distance for a case of an OSR with and without dispersion. The laser spectrum substantially overlaps with the negative dispersion peak of the OSR. As shown in FIG. 18, the negative distance indicates a fiber having negative dispersion of that length. So, for example, −100 km indicates a 100 km dispersion compensating fiber having −17 ps/nm/km dispersion.

FM Sources

The present invention teaches a variety of methods for generation of a dispersion tolerant FM signal with high extinction ratio (ER). In one preferred embodiment of the present invention the FM signal is generated in two steps.

First, a base digital signal is chosen to modulate a directly modulated DFB laser so as to generate an FM signal with adiabatic chirp such that the phase difference between two 1 bits separated by an odd number of 0 bits is an odd integer multiple of π. As an example, for a 10 Gb/s NRZ signal with 100 ps pulses and near square shaped instantaneous frequency profile, this is 5 GHz.

Figure 19:
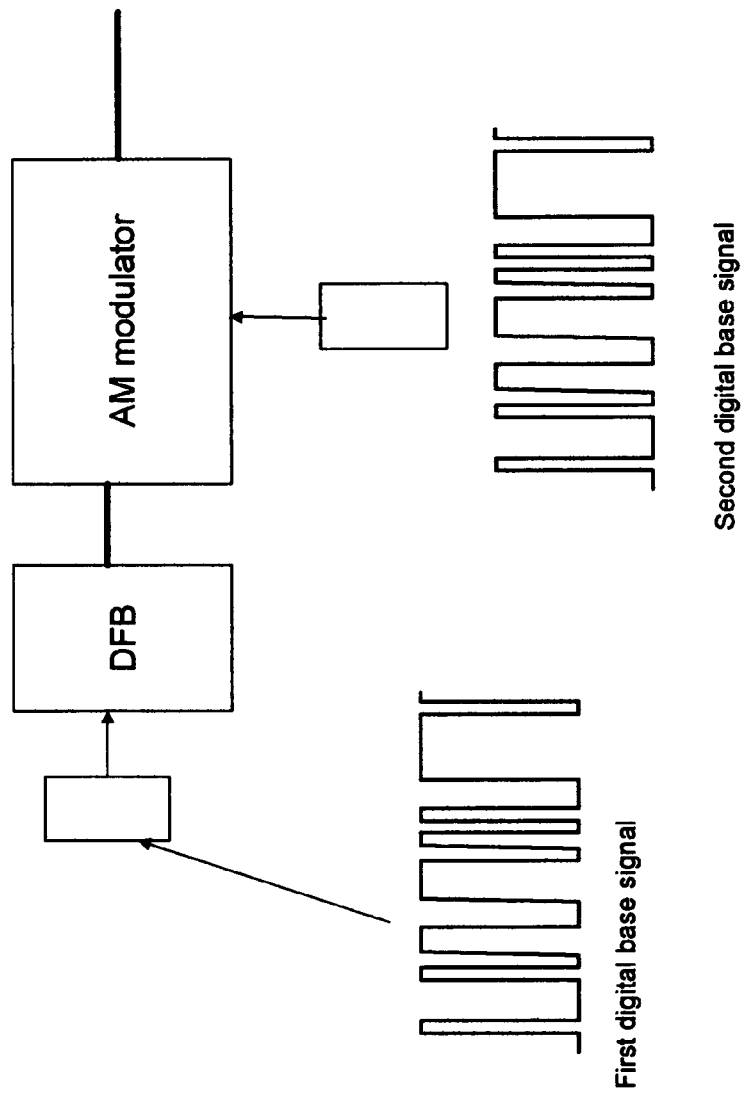
FIG. 19 illustrates FM optical source with a DFB FM modulator and separate amplitude modulator.
Figure 20:
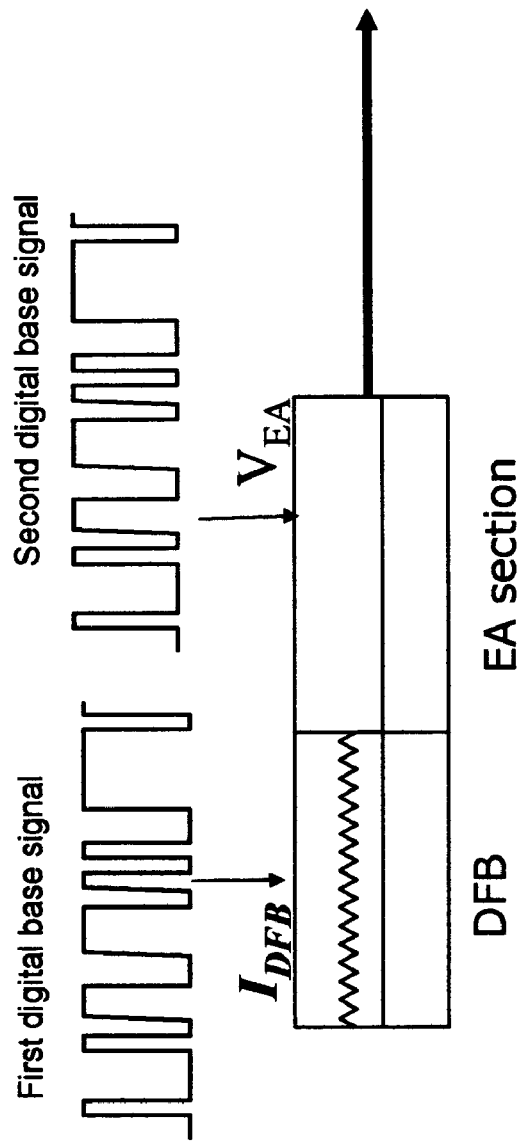
FIG. 20 illustrates FM optical source with a modulated DFB and integrated Electro-absorption modulator.

Next, the resulting optical signal is sent through a second amplitude modulator, such as a LiNbO$_3$ modulator or an electro-absorption modulator, as shown in FIG. 19. The amplitude modulator is modulated by a second digital base signal, which is a replica of the first digital base signal. The base signal supplied to the modulator may be inverted relative to that modulating the laser, depending on the transfer function of the modulator. This is the case, for example, if a higher signal increases the loss of the modulator. Hence, a high signal produces a higher amplitude optical signal from the laser and a corresponding low signal is supplied to the modulator. The AM modulator may be a variety of optical amplitude modulators such as a LiNbO$_3$ modulator, or an electro-absorption modulator. The DFB and EA may be integrated on the same chip, as shown in FIG. 20.

Figure 21:
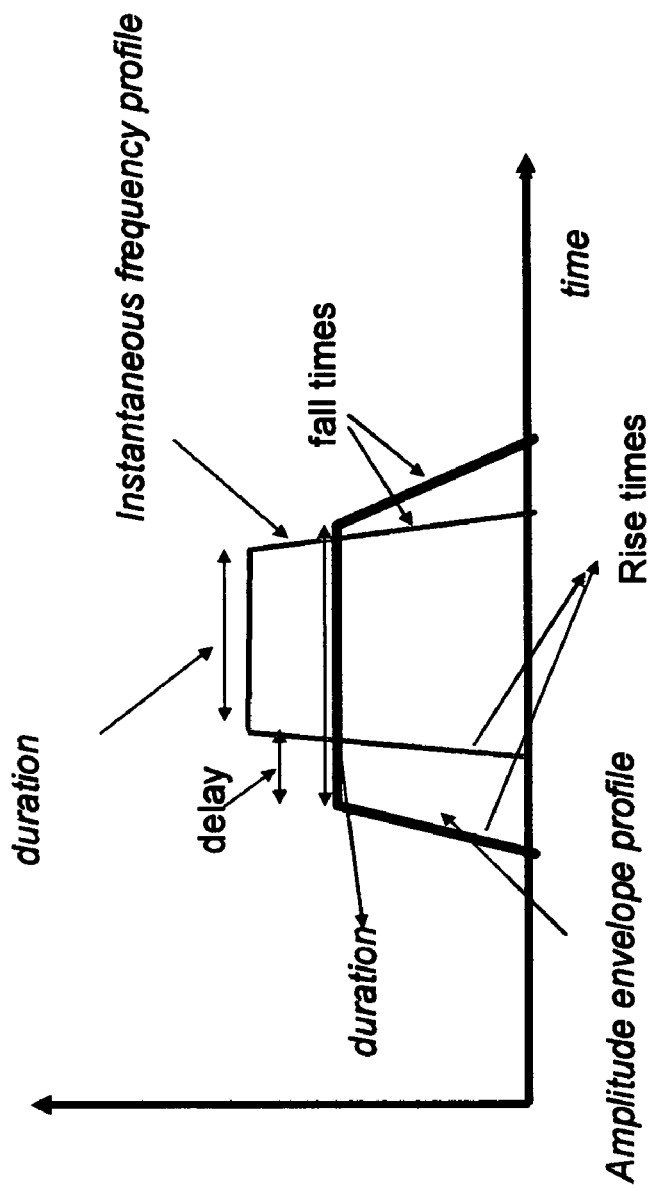
FIG. 21 illustrates the temporal profiles of the AM and FM signals.

In one preferred embodiment of the present invention, the first and second base signals supplied to the laser and modulator may be adapted to generate FM and AM signals, respectively. These FM and AM signals are different in temporal profiles, as demonstrated in FIG. 21, in that there may be a phase difference between the two digital base signals. Also, the rise time and fall time of the instantaneous frequency of the first signal and the rise time and fall time of the resulting second signal after the AM modulator may be different. In addition, the durations of the FM and AM pulse profiles may be different. In a preferred embodiment of the present invention the duration, rise time and fall time, adiabatic chirp, amplitude modulation depth, and the phase delay between the two digital base signals are varied, as described by the prescriptions and examples above, so as to increase the dispersion tolerance of the transmitted signal to fiber dispersion. These parameters for the frequency and amplitude profiles are defined in FIG. 21.

Figure 22:
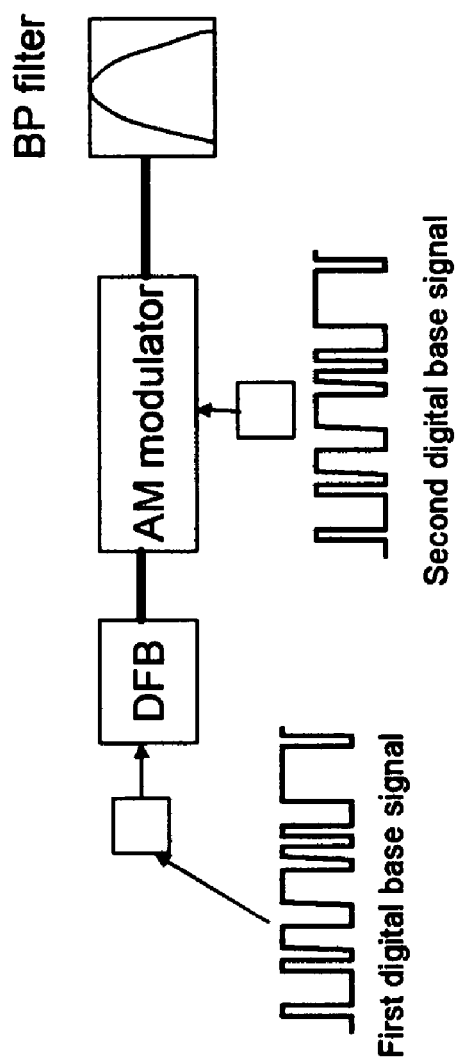
FIG. 22 illustrates an optical FM/AM source with a bandwidth limiting OSR or filter.

In another embodiment of the present invention, and as shown in FIG. 22, there may be a bandwidth limiting filter or an OSR placed after the FM/AM source described above. The OSR or filter is chosen so as to reduce the optical frequency components that are at, or higher than, the bit rate frequency, 10 GHz for a 10 Gb/s NRZ signal, for example.

Parameter Ranges

In various embodiments of the present invention, for longer distance transmission of signal, performance after the optical spectrum reshaper needs to be optimized, leading to the following preferred characteristics:
(i) AM ER<3 dB (i.e., the extinction ratio of the laser's intensity output is preferably less than 3 dB in order to minimize transient chirp);
(ii) adiabatic chirp in the range 2.5-7.5 GHz (i.e., the adiabatic chirp of the laser's output $\Delta f = f_1 - f_0 \approx 2.5\text{-}7.5$ GHz for optimum transmission); and
(iii) Optical spectrum reshaper bandwidth is in the range of 5-10 GHz (i.e., the OSR has a filter bandwidth of 5-10 GHz to maximize spectral narrowing effect).
(iv) Transient chirp in the laser output may have transient chirp of between about 0% and to about 30% of the bit rate frequency of a base digital signal.
(v) The bit rate of the base digital signal may be about 10 Gb/s and the frequency excursion of the transient chirp component of the laser output may be from about 0 to about 3 GHz.
(vi) The frequency excursion of the laser output may cause a frequency excursion of the second signal to be between about 25% to about 75% of a bit rate frequency of the base digital signal.

MODIFICATIONS

It will be appreciated that still further embodiments of the present invention will be apparent to those skilled in the art in view of the present disclosure. It is to be understood that the present invention is by no means limited to the particular constructions herein disclosed and/or shown in the drawings, but also comprises any modifications or equivalents within the scope of the invention.

What is claimed is:

1. A fiber optic communication system comprising:
an optical signal source adapted to receive a base binary signal and produce a first signal, said first signal being frequency modulated including high frequency portions and low frequency portions having a bit period; and
an optical spectrum reshaper adapted to reshape the first signal into a second signal, said second signal being amplitude modulated and frequency modulated;
wherein the frequency excursion and bit period of the first signal are effective to cause high frequency portions separated by an odd number of low frequency portions to be between $\pi/2$ and $3\pi/2$ out of phase.

2. A fiber optic communication system as in claim 1 wherein the frequency excursion of the first signal is effective to cause a frequency excursion of the second signal to be substantially equal to ½ the bit rate frequency of the base digital signal.

3. A fiber optic communication system as in claim 1 wherein the frequency excursion of the first signal comprises an adiabatic chirp component.

4. A fiber optic communication system as in claim 3 wherein the frequency excursion of the first signal further comprises a transient chirp component.

5. A fiber optic communication system as in claim 4 wherein a frequency excursion of the transient chirp component of the first signal is between about 0% to about 30% of the bit rate frequency of the base digital signal.

6. A fiber optic communication system as in claim 4 wherein the bit rate of the base digital signal is about 10 Gb/s and the frequency excursion of the transient chirp component of the first signal is about 0 to about 3 GHz.

7. A fiber optic communication system as in claim 1 wherein the frequency profile of the second signal is substantially flat-topped.

8. A fiber optic communication system as in claim 1 wherein the frequency excursion of the first signal is adjusted such that the frequency excursion of the second signal is between about 25% to about 75% of the bit rate frequency of the base digital signal.

9. A fiber optic communication system as in claim 1 wherein the frequency excursion of the first signal is, effective to cause 1 bits separated by an odd number of 0 bits in the second signal to be $\pi$ out of phase.

10. A fiber optic communication system as in claim 1 wherein the slope of slope of the optical spectrum reshaper effective to simultaneously optimize the bit error rate of the second signal both before and after propagation through dispersive fiber.

11. A fiber optic communication system as in claim 1 wherein the frequency excursion of the first signal is effective to cause the frequency excursion of the second signal to be substantially equal to an odd integer multiple of ½ times the bit rate frequency.

12. A fiber optic communication system as in claim 1 wherein the frequency excursion of the first signal is, effective to cause the phase of 1 bits separated by an odd number of 0 bits in the second signal to be an odd integer multiple of $\pi$ out of phase.

13. A fiber optic communication system as in claim 1 wherein the frequency excursion of the first signal is effective to cause the product of the frequency excursion, $\Delta f$, of the second signal with the duration of the 0 bits of the second signal, $T_0$, to be substantially equal to an odd integer multiple of ½.

14. A fiber optic communication system as in claim 1 wherein the extinction ratio of the second signal is greater than or equal to about 10 dB.

15. A fiber optic communication system as in claim 1 wherein the extinction ratio of the second signal is between about 10 dB to about 13 dB.

16. A fiber optic communication system as in claim 1 wherein the frequency excursion of the first signal and the duty cycle of the second signal are, effective to cause the phase difference between 1 bits separated by an odd number of 0 bits to be substantially equal to $\pi$ in the second signal.

17. A fiber optic communication system as in claim 16 wherein the frequency profile of the second signal is substantially flat-topped.

18. A fiber optic communication system as in claim 16 wherein the frequency profile of the first signal is not substantially flat-topped.

19. A fiber optic communication system as in claim 1 wherein the spectral position of the first signal is on the transmission edge of the optical spectrum reshaper.

20. A fiber optic communication system as in claim 19 wherein the spectral position of the first signal is substantially near the peak logarithmic derivative of the transmission profile of the optical spectrum reshaper.

21. A fiber optic communication system as in claim 1 wherein the logarithmic slope of the transmission profile of the optical spectrum reshaper near its transmission peak is substantially linear.

22. A fiber optic communication system as in claim 1 wherein the optical signal source is a semiconductor laser.

23. A fiber optic communication system as in claim 22 wherein the bias of the laser and the amplitude of the base binary signal are effective to simultaneously improve the bit error rate of the second signal both before and after propagation through dispersive fiber.

24. A fiber optic communication system as in claim 22 wherein the bias of the laser and the amplitude of the base binary signal are effective to improve the bit error rate of the second signal after propagation through dispersive fiber.

25. A fiber optic communication system as in claim 1, wherein an angle of incidence of the first optical signal impinging upon the optical spectrum reshaper is between about 1.5 and about 2 degrees.

26. A fiber optic communication system as in claim 1 wherein the optical spectrum reshaper is a multicavity etalon filter.

27. A fiber optic communication system as in claim 1 wherein the optical spectrum reshaper is an edge filter.

28. A fiber optic communication system as in claim 1 wherein the rise time and fall time of the frequency profile of the second signal are adjusted by adjusting the slope (in dB/GHz) of the transmission profile of the optical spectrum reshaper.

29. A fiber optic communication system comprising:
an optical signal source adapted to receive a base binary signal and produce a first signal, said first signal being frequency modulated including high frequency portions and low frequency portions having a bit period; and
an optical spectrum reshaper adapted to reshape the first signal into a second signal, said second signal being amplitude modulated and frequency modulated;
wherein a slope of the slope of the optical spectrum reshaper is between about 0.38 dB/GHz$^2$ and about 0.6 dB/GHz$^2$.

30. A fiber optic communication system comprising:
an optical signal source adapted to receive a base binary signal and produce a first signal, said first signal being frequency modulated; and
an optical spectrum reshaper adapted to reshape the first signal into a second signal, said second signal being amplitude modulated and frequency modulated;
wherein a 3 dB bandwidth of the optical spectrum reshaper is between about 65% and about 90% of the bit rate of the first signal.

31. A fiber optic communication system comprising:
an optical signal source adapted to receive a base binary signal and produce a first signal, said first signal being frequency modulated; and
an optical spectrum reshaper adapted to reshape the first signal into a second signal, said second signal being amplitude modulated and frequency modulated;
wherein the field transmission profile of the optical spectrum reshaper is that of a second order Bessel filter.

32. A fiber optic communication system comprising:
an optical signal source adapted to receive a base binary signal and produce a first signal, said first signal being frequency modulated; and
an optical spectrum reshaper adapted to reshape the first signal into a second signal, said second signal being amplitude modulated and frequency modulated;
wherein the field transmission profile of the optical spectrum reshaper is that of a fourth order Bessel filter.

33. A method for transmitting an optical signal through a transmission fiber comprising: receiving a base binary signal;
operating an optical signal source using the base binary signal to produce a first signal, said first signal being frequency modulated;
passing the frequency modulated signal through an optical spectrum reshaper so as to reshape the first signal into a second signal, said second signal being amplitude modulated and frequency modulated including high frequency portions and low frequency portions having a bit period; and
passing the second signal through a transmission fiber;
wherein the frequency excursion and bit period of the second signal are effective to cause high frequency portions separated by an odd number of low frequency portions to be between about $\pi/2$ to about $\pi t/2$ out of phase.

34. A method according to claim 33 wherein the frequency excursion of the first signal is effective to cause the frequency excursion of the second signal to be substantially equal to ½ the bit rate frequency of the base digital signal.

35. A method according to claim 33 wherein the frequency excursion of the first signal comprises an adiabatic chirp component.

36. A method according to claim 33 wherein the frequency profile of the second signal is substantially flat-topped.

37. A method according to claim 33 wherein the frequency excursion of the first signal is effective to cause 1 bits separated by an odd number of 0 bits to be $\pi$ out of phase in the second signal.

* * * * *